US010391436B2

(12) United States Patent
Schmelzle et al.

(10) Patent No.: US 10,391,436 B2
(45) Date of Patent: Aug. 27, 2019

(54) HOUSING, HOUSING COVER AND CONNECTING PART OF A DEVICE FOR SEPARATING AT LEAST ONE FLUID FROM A GAS AND A DEVICE FOR THE SEPARATION OF A FLUID

(71) Applicant: MANN+HUMMEL GmbH, Ludwigsburg (DE)

(72) Inventors: Janine Schmelzle, Karlsruhe (DE); Klemens Dworatzek, Edingen (DE); Bertram Bartelt, Steinheim (DE); Daniela Zinic, Dudenhofen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 89 days.

(21) Appl. No.: 15/814,701

(22) Filed: Nov. 16, 2017

(65) Prior Publication Data

US 2018/0104632 A1 Apr. 19, 2018

Related U.S. Application Data

(63) Continuation-in-part of application No. 14/817,358, filed on Aug. 4, 2015, now Pat. No. 10,035,092,
(Continued)

(30) Foreign Application Priority Data

Feb. 4, 2013 (DE) ........................ 10 2013 001 842
Aug. 4, 2014 (DE) ........................ 10 2014 011 303

(51) Int. Cl.
*B01D 46/00* (2006.01)
*B01D 46/24* (2006.01)

(52) U.S. Cl.
CPC ..... *B01D 46/0031* (2013.01); *B01D 46/0005* (2013.01); *B01D 46/24* (2013.01); *B01D 2271/022* (2013.01)

(58) Field of Classification Search
CPC ............ B01D 46/0031; B01D 46/0004; B01D 46/0005; B01D 46/24; B01D 46/2411;
(Continued)

(56) References Cited

U.S. PATENT DOCUMENTS 4,632,682 A 12/1986 Erdmannsdoerfer
5,595,588 A 1/1997 Blevins
(Continued)

FOREIGN PATENT DOCUMENTS

CN 1795040 A 6/2006
DE 8806694 U1 9/1989
(Continued)

*Primary Examiner* — Robert Clemente
(74) *Attorney, Agent, or Firm* — James Hasselbeck

(57) ABSTRACT

A cup-shaped housing assembly for a device for separating liquid from air has a cup-shaped housing body having an interior. At least one annular filter element for separating liquid from air is arranged in the housing body. A housing cover closes off an end face of the housing body. The housing cover has an inner side that is facing the interior and an outer side that is facing away from the interior. The housing cover has at least one raw air inlet through which raw air is supplied to the interior. The housing cover has at least one clean air opening though which filtered clean air is discharged from the interior.

24 Claims, 16 Drawing Sheets

Related U.S. Application Data which is a continuation-in-part of application No. 14/172,202, filed on Feb. 4, 2014, now Pat. No. 9,248,393.

(58) Field of Classification Search
CPC .......... B01D 46/2414; B01D 2271/022; B01D 46/003
See application file for complete search history.

(56) References Cited

U.S. PATENT DOCUMENTS

| | | | | | |
|---|---|---|---|---|---|
| 5,788,859 | A | | 8/1998 | Biere | |
| 5,803,715 | A | * | 9/1998 | Kitchener | B01D 46/003 417/295 |
| 5,938,513 | A | | 8/1999 | Slepikas et al. | |
| 6,972,092 | B1 | | 12/2005 | Roll | |
| 2007/0144350 | A1 | | 6/2007 | Paling | |
| 2007/0209992 | A1 | | 9/2007 | Johnson et al. | |
| 2009/0242470 | A1 | | 10/2009 | Muenkel et al. | |
| 2010/0000412 | A1 | * | 1/2010 | Heikamp | B01D 46/003 96/189 |
| 2010/0126928 | A1 | | 5/2010 | South et al. | |
| 2012/0167534 | A1 | | 7/2012 | Muenkel et al. | |
| 2015/0101293 | A1 | | 4/2015 | Dworatzek et al. | |

FOREIGN PATENT DOCUMENTS

| | | | |
|---|---|---|---|
| DE | 10329401 | A1 | 1/2005 |
| DE | 102005057630 | A1 | 6/2007 |
| EP | 1495934 | A2 | 1/2005 |

* cited by examiner

HOUSING, HOUSING COVER AND CONNECTING PART OF A DEVICE FOR SEPARATING AT LEAST ONE FLUID FROM A GAS AND A DEVICE FOR THE SEPARATION OF A FLUID

CROSS-REFERENCE TO RELATED APPLICATIONS

This application is a continuation-in-part of U.S. application Ser. No. 14/817,358 filed Aug. 4, 2015, which is a continuation-in-part of U.S. application Ser. No. 14/172,202 filed Feb. 4, 2014, now U.S. Pat. No. 9,248,393 issued Feb. 2, 2016. The entire contents of the aforesaid U.S. applications being incorporated herein by reference. U.S. application Ser. No. 14/817,358 claims the benefit of German patent application DE 10 2014 011 303.5 filed Aug. 4, 2014. U.S. application Ser. No. 14/172,202 claims the benefit of German patent application DE 10 2013 001 842.0 filed Feb. 4, 2013.

TECHNICAL FIELD

The invention relates to a housing of a device for separating at least one fluid, in particular oil, from a gas, in particular air, in particular an air/oil separator box or an air/oil separator element, in particular of a compressor, a compressed air system or a vacuum pump, having at least one first gas passage which, with respect to an axis, in particular an assembly axis, of the housing is centrally, in particular coaxially, disposed on a connecting device, having at least one second gas passage which, with respect to the axis, is disposed radially outward from the at least one first gas passage, and having at least one fluid outlet for fluid separated from the gas, which is disposed with regard to the axis radially between the at least one first gas passage and the at least one second gas passage.

The invention further relates to a housing cover of a housing of a device for separating at least one fluid, in particular oil, from a gas, in particular air, in particular an air/oil separator box or an air/oil separator element, in particular of a compressor, a compressed air system or a vacuum pump, having at least one first gas passage which, with respect to an axis, in particular an assembly axis, of the housing is centrally, in particular coaxially, disposed on a connecting device, having at least one second gas passage which, with respect to the axis, is disposed radially outward from the at least one first gas passage, and having at least one fluid outlet for fluid separated from the gas, which is disposed with regard to the axis radially between the at least one first gas passage and the at least one second gas passage.

The invention also relates to a connecting part, in particular a connection nipple or connection tube fitting for connecting a device for separating at least one fluid, in particular oil, from a gas, in particular air, in particular an air/oil separator box or an air/oil separator element, in particular of a compressor, a compressed air system or a vacuum pump, with a connection device having at least one gas-conducting space, particularly an inner space, for at least one first gas passage of a housing of the device.

The invention finally relates to a device for separating at least one fluid, in particular oil, from a gas, in particular air, in particular an air/oil separator box or an air/oil separator element, in particular of a compressor, a compressed air system or a vacuum pump, having at least one first gas passage which, with respect to an axis, in particular an assembly axis, of the housing is centrally, in particular coaxially, disposed on a connecting device, having at least one second gas passage which, with respect to the axis, is disposed radially outward from the at least one first gas passage, and having at least one fluid outlet for fluid separated from the gas, which is disposed with regard to the axis radially between the at least one first gas passage and the at least one second gas passage.

BACKGROUND

The invention concerns a cup-shaped housing assembly for a device for separating liquid from air, wherein the cup-shaped housing assembly is designed for receiving at least one filter element that is configured in particular as an annular coalescing element for separation of liquid from air and wherein the cup-shaped housing assembly for closing off its open end face has a housing cover, wherein the housing cover, for discharging the filtered clean air, has at least one clean air opening and wherein the housing cover has at least one raw air inlet for supply of raw air.

The present invention concerns moreover a device for separating liquid from air comprising a cup-shaped housing assembly with a filter element that is designed in particular as an annular coalescing element.

The present invention concerns also a method for mounting a cup-shaped housing assembly on a nipple for detachable connection of the cup-shaped housing assembly with a connecting head that is in particular connected to a compressed air compressor, wherein the cup-shaped housing assembly is detachably connected to the nipple, for example, screwed onto the nipple.

The publication DE 85 01 736.1 U1 discloses a device of the afore mentioned kind and this device is designed for separating oil droplets from air. The filter element or separating element is designed as an annular coalescing element that coalesces the fine oil droplets to larger droplets in the separating element and the larger droplets deposit downstream thereof in downward direction due to the force of gravity. A nipple which is designed as a threaded tubular socket is detachably connectable to a connecting head and a cup-shaped housing assembly in which the filter element is arranged. For discharging the clean air, the connecting head has a central pipe or cylindrical tubular element that projects through the nipple and opens into the filter element. The cylindrical tubular element embodied for separating the separated liquid from the purified air is thus correlated according to the prior art with the connecting head. The cylindrical tubular element extends through the nipple and projects past it. In the known device for separation of oil droplets from air, an annular gap is arranged between the cylindrical tubular element and the nipple for discharging the separated oil. This annular gap is connected with a separate discharge passage.

SUMMARY OF THE INVENTION

The object of the invention is to further develop a cup-shaped housing assembly of the aforementioned kind, a device for separating liquid from air of the aforementioned kind, as well as a method for mounting a cup-shaped housing assembly of the aforementioned kind in such a way that for discharging the filtered clean air as little energy as possible is required.

In accordance with the present invention, this is achieved in that for sealing between the raw air side and the clean air side, in particular for sealing the raw air inlet from the clean air opening, on the outer side of the housing cover which is facing away from the interior of the cup-shaped housing assembly at least over areas thereof at least one sealing surface is arranged.

This is further achieved by a device that is characterized in that the cup-shaped housing assembly is embodied as disclosed above.

This is further achieved in regard to the method in that the cup-shaped housing assembly is detachably connected to the nipple, for example, is screwed onto the nipple.

Accordingly, the invention resides in that, for sealing between the clean air side and the raw air side, in particular for sealing the raw air inlet from the clean air opening, on the outer side of the housing cover that is facing away from the interior of the cup-shaped housing assembly at least one sealing surface is provided at least across partial sections thereof. The cup-shaped housing assembly according to the invention and the device according to the invention thus have additionally a sealing surface on the outer side of the housing cover of the cup-shaped housing assembly.

This has the advantage that, in contrast to the prior art, the liquid drain for discharging the separated liquid from the interior of the cup-shaped housing assembly can be realized in the area of the clean air opening of the housing cover. Accordingly, an air/oil separator box can be provided that has a space-saving liquid drain. In contrast to the prior art, the liquid drain must not be located within the nipple which is connected to the cup-shaped housing assembly and no tubular element must be arranged within the nipple for providing the liquid drain.

At least one liquid drain is formed as at least one groove or at least one recess (passage, bore) in the housing cover that is arranged in radial direction between the at least one clean air opening at the housing cover and the at least one raw air inlet arranged off-center in the housing cover. The at least one sealing surface is arranged annularly and radially between the at least one raw air inlet and the at least one liquid drain at the housing cover such that the at least one sealing surface seals the at least one raw air inlet relative to the at least one liquid drain.

The cup-shaped housing assembly comprises a liquid collecting chamber at a clean air side of the filter element and the liquid drain is connected to or communicates with the liquid collecting chamber.

Advantageously, the clean air opening is configured for receiving a nipple which is extending through the housing cover in the direction of the longitudinal axis of the cup-shaped housing assembly. Moreover, for detachable connection of the housing cover with the nipple, the housing cover has advantageously in the area of the clean air opening at least one connecting section that is detachably connectable to the nipple wherein the sealing surface is arranged in such a way on the housing cover that in the connected state of the housing cover with the nipple the sealing surface is located between housing cover and nipple and seals the raw air inlet relative to the clean air opening. Alternatively, the sealing surface can be arranged in such a way on the housing cover that in the connected state of the housing cover with the nipple the sealing surface is located between housing cover and a connecting head which is connected to the nipple and seals the raw air inlet relative to the clean air opening.

For discharging the separated liquid from the interior of the cup-shaped housing assembly, in a particularly preferred embodiment of the present invention the nipple and/or the cup-shaped housing assembly, in particular the connecting section of the housing cover that is detachably connected to the nipple, are designed such that at least one liquid drain is arranged between the cup-shaped housing assembly, in particular the housing cover, and the nipple in the connected state of the cup-shaped housing assembly, in particular of the housing cover, with the nipple. The separated liquid can thus be discharged from the interior of the cup-shaped housing assembly in the connected state of the housing cover with the nipple without an additional tubular element having to be inserted into the nipple for this purpose. Accordingly, the inner diameter of the nipple is not narrowed by the inserted additional tubular element.

Instead, the nipple can have a cylinder-shaped tubular element adjoining the connecting section of the nipple which is detachably connectable to the cup-shaped housing assembly wherein the tubular element is designed for separation of the separated liquid from the purified air and forms a clean air outlet for discharging the filtered clean air from the cup-shaped housing assembly. In contrast to the prior art, the nipple itself can be designed as a clean air outlet and can have substantially the same inner diameter as the connecting section of the nipple that is detachably connectable to the cup-shaped housing assembly. In comparison to the prior art where the clean air inlet is formed by a tubular element inserted into the nipple, in the present invention the inner diameter for clean air outlet is substantially greater so that a reduced pressure differential results and less energy is required for discharging the filtered clean air.

Advantageously, the liquid drain extends in the direction of the longitudinal axis of the cup-shaped housing assembly, i.e., extends axially, from the inner side of the housing cover which is facing the interior of the cup-shaped housing assembly to the outer side of the housing cover which is facing away from the interior of the cup-shaped housing assembly. Advantageously, the liquid drain is arranged in radial direction between the usually centrally arranged clean air outlet and the raw air inlet that is arranged off-center. For example, the raw air inlet and/or the liquid drain can be formed by several openings or recesses which are arranged in a circular shape regularly or irregularly about the clean air outlet.

For detachably connecting the cup-shaped housing assembly with the nipple, the cup-shaped housing assembly and the nipple can be connected to each other by means of a screw connection or by means of a bayonet coupling. The connecting section of the housing cover that is detachably connectable to the nipple can be designed, for example, as an inner thread of the housing cover that, for detachably connecting to the cup-shaped housing assembly with the nipple, can be screwed onto an outer thread of the nipple. Advantageously, in this embodiment the connecting section of the nipple that is detachably connectable to the housing cover is thus designed as an outer thread.

The liquid drain can be formed by a groove which is arranged on the connecting section of the housing cover which is detachably connectable to the nipple, for example, in the inner thread of the housing cover, and/or on the connecting section of the nipple detachably connectable to the housing cover, for example, in the outer thread of the nipple.

In this context, the liquid drain can be a straight groove extending in the direction of the longitudinal axis of the cup-shaped housing assembly.

In order to provide a greater drain cross-section, several grooves described in the two preceding paragraphs can be arranged regularly or irregularly in a circular shape in circumferential direction.

Alternatively, the liquid drain can also be extending in a spiral shape from the inner side of the housing cover facing the interior of the cup-shaped housing assembly to the the outer side of the housing cover that is facing away from the interior of the cup-shaped housing assembly. For example, the liquid drain can be formed by an enlarged thread depth of the inner thread of the housing cover and/or by an enlarged thread depth of the outer thread of the nipple.

Alternatively, the liquid drain can be formed by at least one channel-like recess or bore in the housing cover that extends preferably axially and is further preferably radially positioned between the centrally arranged clean air opening in the housing cover and at least one off-center raw air inlet provided at the housing cover.

In a preferred embodiment, the sealing surface is arranged annularly between the raw air inlet and the liquid drain at the housing cover such that it seals the raw air inlet from the liquid drain. In this way, preferably two pressure levels are created, a first pressure level at the raw air side upstream of a filter element arranged in the cup-shaped housing assembly and a second pressure level downstream of the filter element at the clean air side, wherein the clear air outlet and the clean air opening and the liquid drain communicate with the clean air chamber and are therefore arranged at the pressure level of the clean air side.

For separating liquid from air, in the cup-shaped housing assembly at least one filter element in the form of an annular coalescing element is arranged that divides the interior of the cup-shaped housing assembly into a clean air chamber and a raw air chamber. The filter element can be an exchangeable filter element. Alternatively, the filter element in a service situation can be completely replaced together with the cup-shaped housing assembly. The filter element can be, for example, a filter element of a so-called spin-on filter. The filter element can comprise at least one filter medium. As a filter medium, glass fiber material, for example, multi-coiled glass fibers and/or nonwoven glass fibers, can be used.

In a preferred embodiment, the filter element has at an end that is facing the housing cover, in particular, the end disk arranged thereat, a liquid collecting chamber that is connectable with the liquid drain. The separated liquid can be returned from the liquid collecting chamber through the liquid drain into the sump of the power machine, e.g. the compressor.

The filter element can also be used for liquids of any kind of a power machine, in particular a compressor, for example, a compressed air compressor, such as oil, fuel, hydraulic liquids or even cooling medium.

For supplying raw air into the cup-shaped housing assembly, the housing cover has at least one raw air inlet. This raw air inlet is preferably arranged off-center at the housing cover. Preferably, an outer sealing surface or seal is provided for sealing the raw air inlet relative to the environment. The sealing surface or seal is designed preferably as a sealing ring that can be compressed relative to the connecting head and that is arranged so as to surround the raw air inlet or inlets at the housing cover. The raw air inlet can extend in axial direction in a connecting head which is detachably connected to the nipple. The connecting head that is detachably connected to the nipple can be a separate connecting flange or can also be formed by a component of the compressed air compressor, for example, the compressor housing.

As disclosed above, the discharge of the clean air is done through the opening of the housing cover. The clean air outlet for discharging the filtered clean air from the cup-shaped housing assembly is preferably formed by the nipple. The nipple is preferably arranged centrally in the housing cover. The liquid drain is correlated with the clean air side of the device. For sealing between the raw air side and the clean air side, in particular for sealing the liquid drain relative to the raw air inlet, the housing cover is formed at the outer side which is facing away from the interior of the cup-shaped housing assembly at least partially as a sealing surface. Independent thereof or in conjunction therewith, for sealing between the raw air side and the clean air side of the device, on the outer side of the housing cover which is facing away from the interior of the cup-shaped housing assembly at least one sealing surface can be arranged at least across partial sections thereof.

According to an advantageous embodiment of the invention, the sealing surface can be formed by a surface area of the housing cover. In this case, the housing cover itself is formed on the outer side, which is facing away from the interior of the cup-shaped housing assembly, at least partially as a sealing surface. A sealing surface formed by the housing cover itself is advantageous because it cannot slide or be lost.

For example, the sealing surface can be formed by a metal surface of the housing cover. This has the advantage that the sealing surface is insensitive to temperature fluctuations and has a long service life. This sealing surface can interact with a metal surface of the nipple or a metal surface of a socket or a connecting head in such a way that a sealing action between the raw air side and the clean air side is provided. Thus, without an extra seal, a sealing action is possible in that two metal surfaces are brought into contact with each other so as to be seal-tight. In particular, the housing cover, for example, a threaded plate of the housing cover, can be resting seal-tightly on the nipple. In addition or as an alternative, the housing cover, for example, a threaded plate of the housing cover, can rest seal-tightly resting on the connecting head, for example, a filter head.

As an alternative to or in addition to the sealing surface which is provided in an area of the housing cover, the sealing surface can be formed by at least one seal that is arranged on the housing cover, for example, by a plastic seal. For attachment on the housing cover, the plastic seal can be attached by injection molding by means of an injection molding process to the housing cover and/or to the nipple. Alternatively, the sealing surface can be clipped onto, clamped onto, or glued onto the housing cover and/or onto the nipple.

For clipping or clamping onto the housing cover, the sealing surface can be a seal with at least one fixation element that extends in the direction of the longitudinal axis of the cup-shaped housing assembly. When the connecting section of the housing cover that is detachably connectable to the nipple is designed such that in the connected state of the housing cover with the nipple several liquid drains are arranged between housing cover and nipple for draining the separated liquid from the interior of the cup-shaped housing assembly, the fixation element can be designed such that it can be arranged on the housing cover in such a way that it extends through one of the liquid drains and in this way secures the seal on the housing cover.

The seal surface can be designed annularly or cylindrical, for example, can be in the form of an annular or cylindrical seal.

The sealing surface is advantageously designed for sealing between housing cover and nipple. The sealing surface or seal is located in axial direction seal-tightly on the nipple or a corresponding surface of the connecting head. For example, the sealing surface, in axial direction, can be arranged between the cup-shaped housing assembly and a projection of the nipple that extends radially, i.e., perpendicular to the longitudinal direction of the cup-shaped housing assembly and is, for example, a collar of the nipple. This radial projection is positioned advantageously with axial sealing action on the connecting head of the power machine when the nipple is connected to the connecting head. The liquid drain can extend in axial extension of the connecting section of the housing cover with the nipple through the collar of the nipple. The raw air inlet is preferably arranged on the exterior side of the collar which is facing away from the nipple. This raw air inlet can extend in axial direction into the connecting head of the power machine. For sealing between the raw air side and the clean air side, in this embodiment the sealing surface in the connected state of the cup-shaped housing assembly, in particular of the housing cover, with the nipple interacts with the collar of the nipple such that a sealing action between the raw air inlet and the liquid drain is realized.

In a further aspect of the invention, the object is to design a housing, a housing cover, a connecting part and a device of the aforementioned type, in which a leakproofness of connections of at least one gas passage and/or at least one fluid outlet, in particular a liquid outlet of the housing, with the connection device and/or the connecting part, can be improved. In particular, any tolerances, in particular component-related and/or assembly-related tolerances, can be better compensated.

This object is achieved with the housing according to the invention in that between the at least one second gas passage and the at least one fluid outlet is disposed at least one housing-side fluid outlet sealing device, which can sealingly interact with at least one corresponding connection-side fluid outlet sealing part or a connecting part, which is provided for connecting the housing with the connection device.

According to the invention, disposed between the at least one second, outer gas passage and the at least one fluid outlet is at least one housing-side fluid outlet sealing part of at least one fluid outlet sealing device. The at least one housing-side fluid outlet sealing part can sealingly interact with at least one corresponding connection-side fluid outlet sealing part of the connecting part. The at least one second gas passage can be sealed against the at least one fluid outlet with the at least one fluid outlet sealing device. In this way, the risk can be reduced that gas from the at least one second gas passage can enter the at least one fluid outlet and/or that separated fluid from the at least one fluid outlet can enter the at least one second gas passage.

The connecting part serves to connect the housing with the connection device, in particular with a corresponding fluid line or gas line. At least one part of the connecting part can be a part of the housing, or fixedly or releasably connected thereto, in particular pre-installed. Alternatively or additionally, at least one part of the connecting part can be a part of the connection device, or fixedly or releasably connected thereto, in particular pre-installed. Accordingly, the at least one connection-side fluid outlet sealing part can be fixedly or removably connected with the connecting part and/or the connection device.

The at least one housing-side fluid outlet sealing part can sealingly interact with the at least one connection-side fluid outlet sealing part, in particular automatically, when the housing is correspondingly connected with the at least one corresponding fluid outlet sealing part of the connecting part and/or the connection device.

The connection device can advantageously be a connector head. The connector head can have corresponding feed lines and/or discharge lines for the gas and/or separated fluid.

The connecting part can advantageously be fixedly or removably connected with the housing on the housing side and/or with the connection device on the connection side.

Advantageously, the connecting part can have a tube-like, in particular cylindrical and/or conical, connection piece or connection section. The tube-like connection piece can, in particular when it is connectible on the housing side and removable, also be referred to as a nipple or a connection nipple.

Advantageously, the housing can be connected with the connection device by means of a screw and/or plug-in connection. The screw and/or plug-in connection can advantageously be pluggable or screwable with respect to the axis. In this case, the axis can coincide with an assembly axis of the housing with the connection device, in particular the housing with the connecting part and/or the connecting part with the connection device. The housing can in particular be screwed by means of a screw connection directly or indirectly, in particular by means of the connecting part, in or on the connection device.

Advantageously, the axis, in particular the assembly axis, can be coaxial or parallel to a housing axis of the housing and/or an element axis of a filter element and/or separating element. The axis can advantageously be coaxial with an axis of the connecting part.

The connecting part can have at least a connection element for connection with the housing and/or the connection device, in particular by means or a screw and/or plug-in connection, in particular a screw connection, a plug connection, a clamp connection, a latching connection and/or a bayonet-type connection or the like. In particular, the connecting part may have at least on external thread and/or at least one internal thread. Accordingly, the housing and/or the connection device can have at least one suitable inner thread and/or at least one outer thread. The thread can advantageously be coaxial with the axis, in particular the assembly axis.

The housing can advantageously be cup-shaped or pot-shaped. Advantageously, the housing, in particular a housing vessel, can be closed on one end face by a housing cover. Advantageously, the connecting part and/or the connection device can be especially optionally connected with the housing cover at one end face.

Advantageously, the housing, in particular the housing vessel and/or the housing cover, can be made of metal and/or plastic or at least have these materials.

Advantageously, the housing, in particular the housing vessel and/or the housing cover, can be axial or coaxial to the axis, in particular the assembly axis.

In the housing can advantageously be disposed at least one separating element for separating the fluid from the gas, in particular at least one filter element, at least one coalescing element, at least one separation or baffle wall and/or a cyclone or the like, or a combination of various separating elements. The fluid can be separated from the gas by means of the at least one separating element.

Advantageously, disposed in the housing can be at least one filter device for filtering gases, in particular an air filter element.

Advantageously, at least one filter medium can be combined or connected with at least one separation medium, in particular a coalescing medium, for the fluid, in particular a liquid. In this way, the assembly space requirement can be reduced.

Advantageously, at least one separation element and/or at least one filter device, in particular a filter medium, can circumferentially surround, in particular completely, the axis, in particular the assembly axis. In particular, the at least one separation element and/or the at least one filter device can be axial or coaxial with the axis, in particular the assembly axis.

Advantageously, the at least one first gas passage can be provided for a flow of gas during operation of the device for separating a fluid, which is oriented oppositely with respect to an interior of the housing to a flow of gas through the at least one second gas passage. Advantageously, the at least one first gas passage can be a gas outlet for treated gas. The at least one second gas passage can be a corresponding gas inlet for gas to be treated. Alternatively, the at least one first gas passage can be a gas inlet, and the at least one second gas passage can be a gas outlet.

The at least one separation element and/or the at least one filter device can advantageously be disposed between at least one gas inlet and at least one gas outlet and separate these from one another. In this way, the at least one separation element and/or the at least one filter device can be forcibly flowed through by the gas.

The gas can flow through the at least one separation element and/or the at least one filter device from radially outside to radially inside with respect to the axis, in particular the assembly axis, or vice versa, depending on which of the gas passages serves as the gas inlet, and which serves as the gas outlet.

The at least one fluid, in particular a liquid such as oil, can be separated from the gas with the at least one separation element. Following gravity, the fluid can drop downwards into a lower region of the housing.

Advantageously, the at least one fluid outlet in the lower region can lead out of the housing. The separated fluid can thus exit the housing through the at least one fluid outlet. The at least one fluid outlet can be connected with a fluid channel, in particular in or on the connecting part and/or the connection device. Advantageously, the at least one housing-side fluid outlet sealing part can be disposed on an end face of the housing, in particular where appropriate the housing cover.

Advantageously, the at least one housing-side fluid outlet sealing part can extend at least partially circumferentially with respect to the axis, in particular the assembly axis. Advantageously, the at least one housing-side fluid outlet sealing part can completely circumferentially surround the axis, in particular the assembly axis.

Advantageously, the at least one housing-side fluid outlet sealing part can particularly completely circumferentially surround at least one, in particular downstream with respect to the flow of fluid, section of the at least one fluid outlet.

Advantageously, the at least one second gas passage can be disposed with respect to the axis, in particular the assembly axis, radially outside the at least one housing-side fluid outlet sealing part.

Advantageously, a plurality of second gas passages can be disposed circumferentially, in particular evenly distributed, with respect to the axis, in particular the assembly axis.

Advantageously, at least one first gas passage, at least one second gas passage and at least one fluid outlet can be disposed on the same side of the housing, in particular on or in the housing cover. In this way, a connection of the housing with the connecting part and/or the connection device can be more easily and/or space-savingly realized.

Advantageously, the invention can be used in a gas/oil separator apparatus, in particular an air/oil separator apparatus, in particular with a so-called air/oil separator box or a so-called air/oil separator element. With a gas/oil separator apparatus, any oil droplets carried with the gas can be separated and removed. Such gas/oil separator apparatuses can advantageously be used in compressors, vacuum pumps or pneumatic systems. They can be disposed before a gas inlet of the corresponding unit. In this way, the gas can be deoiled before it enters the unit. Alternatively or additionally, the at least one gas/air separator apparatus can be disposed after a gas outlet of the unit. In this way, oil, which can enter the gas in particular during operation of the unit, can be removed after emission from the unit. The connection device can advantageously be provided with corresponding gas lines.

The invention can also be used in connection with an internal combustion engine, in particular an intake duct for combustion gas, in particular combustion air, or a crankcase vent. The invention can be used in internal combustion engines of motor vehicles or other types of internal combustion engines, in particular industrial motors. It can also be used outside of internal combustion engines, in particular in motor vehicles.

Instead of in a device for separating oil, the invention can also be used for the separation of other types of fluids from gas. It can also be used in connection with a room air conditioning system or air conditioner.

In an advantageous embodiment, at least one housing-side fluid outlet sealing part can, with respect to the axis, in particular the assembly axis, at least radially sealingly interact with at least one connection-side fluid outlet sealing part. According to the invention, in the connection of the housing with the connecting part and/or the connection device, the housing-side fluid outlet sealing part and the connection-side fluid outlet sealing part can lie at least radially directionally against each other.

Advantageously, sealing forces acting on the fluid outlet sealing parts can be directed exclusively radially with respect to the axis, in particular the assembly axis. In addition, axial force components can also be present. The fluid outlet sealing parts can then seal radially and axially.

A radially sealing sealing device has the advantage that the sealing forces are substantially directed perpendicularly to the corresponding assembly force, which acts between the housing on one side and the connecting part and/or the connection device on the other. The assembly forces are parallel or coaxial with the axis, in particular the assembly axis. In this way, any dimensional tolerances between the housing and the connecting part and/or the connection device can be better compensated. Furthermore, mechanical loads on the at least one fluid outlet sealing device can thus be reduced. Such mechanical loads can be caused in particular by operational vibrations or oscillations.

Furthermore, when the housing is brought together with the connecting part and/or the connection device axially with the axis, in particular the assembly axis, the radially acting fluid outlet sealing device can easily compensate a dimensional tolerance in the axial direction.

In a further advantageous embodiment, at least one housing-side fluid outlet sealing part can have at least one sealing surface acting radially inward or preferably radially outward, which is formed on at least one sealing lip and/or at least one sealing ring, in particular an O-ring, extending at least radially with respect to the axis, in particular the assembly axis. When the housing is brought together with the connecting part and/or the connection device axially to the axis, in particular the assembly axis, a sealing lip or a sealing ring can easily slide along against the at least one corresponding connection-side fluid outlet sealing part.

Advantageously, at least one housing-side fluid outlet sealing part and at least one connection-side fluid outlet sealing part can be coaxial with an axis, in particular with the axis, in particular with the assembly axis. In this way, the corresponding fluid outlet sealing parts can be more easily guided into one another. The fluid outlet sealing parts can thereby easily slide alone one another.

Advantageously, the at least one connection-side fluid outlet sealing part can have at least one sealing surface. Advantageously, the at least one sealing surface can be cylindrical and/or conical. Advantageously, one axis of the at least one cylindrical/conical sealing surface can be parallel or coaxial to the axis, in particular the assembly axis.

Advantageously, at least one housing-side fluid outlet sealing part can be at least partially elastic. In this way, the at least one housing-side fluid outlet sealing part can more easily conform to the corresponding at least one connection-side fluid outlet sealing part. Further, tolerances can thus be compensated and/or vibrations can thus be dampened better and more easily.

Advantageously, the at least one sealing lip and/or at least one sealing ring can be elastic, in particular made from an elastic material.

Advantageously, at least two sealing lips can be provided. At least two sealing lips can be disposed behind one another in the direction of an axis, in particular the axis, in particular the assembly axis. In this way, the sealing effect can be further improved.

O-rings have the advantage that they can easily slide or roll along the corresponding sealing surface of the connection-side fluid outlet sealing part during assembly of the respective components.

In a further advantageous embodiment, at least one housing-side fluid outlet sealing part can be realized in connection with at least one support part, which can be connected in one piece or multiple pieces with at least one housing section, in particular a housing cover, of the housing. At least one housing-side fluid outlet sealing part can be pre-assembled separately with the at least one support part. The pre-assembled assembly can be easily connected in further manufacturing steps to the at least one housing.

The at least one support part can advantageously be connected in one piece or multiple pieces with at least one housing section.

Advantageously, the at least one support part can be connected with the at least one housing section by means of a material fitting and/or form fitting and/or force locking connection, in particular an adhesive connection, welded connection, clamp connection, snap connection, clip connection, screw connection, plug connection and/or a bayonet-like connection.

Advantageously, the at least one support part can be connected with the at least one housing section by means of a, in particular removable, fixing element. The at least one fixing element can advantageously have at least one locking element, in particular a locking arm. The at least one locking arm can have at least one locking lug. The locking lug can be latched or clipped on the side of the housing section.

At least one locking arm can advantageously be locked or clipped on the housing side in at least one passage, in particular a gas passage. The at least one locking arm can advantageously pass through the at least one passage.

The at least one support part can advantageously be connected with a housing cover of the housing.

The at least one support part can advantageously have at least one housing-side fluid outlet sealing part or a receptacle for at least one housing-side fluid outlet sealing part.

The at least one support part can advantageously have at least one sealing lip and/or a sealing groove for a sealing ring.

The at least one housing-side fluid outlet sealing part can advantageously be realized in one piece or multiple pieces on the at least one support part. The at least one support part can advantageously be realized with at least one housing-side fluid outlet sealing part as a two-component part.

In a further advantageous embodiment, the support part can have a first, in particular cylinder-shaped, section, which extends axially outward from the housing section. Hereby, the housing-side fluid outlet sealing part is preferably disposed on the support part, in particular the axial end thereof, such that it extends radially away therefrom, in particular outwardly or inwardly in a ring shape.

The at least one support part can be, in comparison with at least one housing-side fluid outlet sealing part, rigid or dimensionally stable. In this way, the at least one support part can absorb or transfer forward corresponding holding forces and/or sealing forces which can act upon the at least one housing-side fluid outlet sealing part.

The at least one support member can advantageously be annular. It can advantageously circumferentially surround the axis, in particular the assembly axis. The at least one support part can advantageously be coaxial with the axis, in particular the assembly axis.

In a further advantageous embodiment, at least one surrounding sealing device, which can sealingly interact with at least one corresponding, in particular terminal-side and/or connection-side surrounding sealing part of the connection device and/or the connecting part, can be disposed at least between at least one second gas passage and a surrounding of at least one housing-side surrounding sealing part. With the surrounding sealing device, the at least one second gas passage can be sealed towards the surrounding. The space surrounding the housing in its assembly position on the connection device is regarded as the surrounding.

The at least one second gas passage can lie relatively far outward with regard to the axis, in particular the assembly axis. In particular, it can be disposed further outward than the at least one fluid outlet and/or the at least one first gas passage with respect to the axis, in particular the assembly axis.

The housing-side surrounding sealing part can advantageously have at least one seal and/or at least one sealing surface. Accordingly, the at least one in particular terminal-side and/or connection-side surrounding sealing part can have at least one sealing surface and/or at least one seal.

The at least one housing-side surrounding sealing part can advantageously at least axially sealingly interact with the at least one in particular terminal-side surrounding sealing part. In this way, a holding force of the housing against the connection device and/or the connecting part, which is directed parallel to the axis, in particular the assembly axis, can more strongly press the surrounding sealing parts together. A sealing effect can thus be improved.

At least one housing-side surrounding sealing part and at least one housing-side fluid outlet sealing part can advantageously be disposed on the same end face of the housing, in particular the housing cover.

The at least one housing-side surrounding sealing part can advantageously at least partially circumferentially surround at least one housing-side fluid outlet sealing part with respect to the axis, in particular the assembly axis. In this way, the at least one first gas passage and the at least one fluid outlet can also be sealed toward the surrounding.

The at least one surrounding sealing device can also be referred to as an outer sealing device, and the corresponding sealing parts as outer sealing parts. Accordingly, the at least one fluid outlet sealing device can be referred to as an inner sealing device and the sealing parts thereof as inner sealing parts.

Advantageously, the combination of the at least one at least radially acting fluid outlet sealing device and the at least one at least axially acting surrounding sealing device can allow greater dimensional tolerances in the device, in particular in the housing and/or the connection device, for separating at least one fluid.

In a further advantageous embodiment, at least one first gas passage can have an assembly opening for at least one connecting part, in particular a nipple or a pipe stub, and at least one fluid outlet can have at least one passage opening, which is materially technically separated from the at least one assembly opening.

The at least one connecting part can be introduced in the assembly opening. The at least one connecting part can be passed in through the assembly opening and led into an interior of the housing.

In an assembled housing, an axis of the at least one connecting part can advantageously run axially, in particular coaxially, to the axis, in particular the assembly axis. For installation, the at least one connecting part can thus be passed axially to the axis, in particular the assembly axis, through the assembly opening.

The at least one connecting part can advantageously be connected with the assembly opening by means of a screw or plug-in connection, in particular a screw connection.

Advantageously, a radially outer peripheral side of the at least one connecting part can have an outer thread, which can be screwed in to connect to the housing having a corresponding inner thread in the region of the assembly opening.

At least one fluid outlet can advantageously have at least one passage opening, which is materially technically separated from the at least one assembly opening. Advantageously, at least one fluid outlet can be radially spaced from the at least one assembly opening with respect to the axis, in particular the assembly axis. Between the at least one assembly opening and the at least one fluid outlet can be located at least one material section, in particular a web of material of the housing, in particular the housing cover. The material section can separate the assembly opening from the fluid outlet. In particular when a screw connection is used between the connecting part and the housing, the inner thread in the region of the axis, in particular the assembly axis, can thus interact evenly and completely with the outer thread of the connecting part.

In a further advantageous embodiment, at least one gas passage and/or at least one fluid outlet and/or at least one housing-side fluid outlet sealing part and/or at least one housing-side surrounding sealing part can be realized in/on/with a housing cover with an in particular cup-shaped housing. In this way, the mentioned components can be easily realized on the housing cover. The housing cover can be realized and/or pre-assembled independently from the remaining housing, in particular the housing vessel.

During assembly of the device for separation of a fluid, a corresponding separation and/or filter element can be easily introduced into the housing. The housing can then be closed by the housing cover.

The pre-assembled housing can be easily fitted with the connecting part. Alternatively, the connection device can be fitted with the connecting part. The housing and the connection device can then be connected. The connecting part is thereby correspondingly connected with the respective other component. During connection, the gas passages and the at least one fluid outlet can be automatically brought into connection with the corresponding gas channels and fluid channels of the connecting part and/or the connection device. Likewise, depending on the mounting method, the fluid outlet sealing device and optionally the surrounding sealing device can be respectively automatically activated in the same assembly step or in different assembly steps.

Further, the object according to the invention is achieved by the housing cover in that between the at least one second gas passage and the at least one fluid outlet is disposed at least one housing-side fluid outlet sealing device, which can sealingly interact with at least one corresponding connection-side fluid outlet sealing part or a connecting part, which is provided for connecting the housing with the connection device.

In addition, the object according to the invention is achieved by the connecting part in that the connecting part has at least one fluid passage or is at least constructed for at least one fluid outlet of the housing for the fluid separated from the gas, which is disposed outside the at least one gas-conducting space, and at least one connection-side fluid outlet sealing part of the at least one fluid outlet sealing device is disposed on a side opposite the gas-conducting space of the at least one fluid outlet, which can sealingly interact with at least one corresponding housing-side fluid outlet sealing part.

The connecting part comprises at least one connection-side fluid outlet sealing part, in particular at least one sealing surface and/or one sealing receptacle, in particular a sealing groove, for at least one seal and/or at least one seal, at least one fluid outlet sealing device, which can sealingly interact with at least one housing-side fluid outlet sealing part of the at least one fluid outlet sealing device.

Advantageously, the at least one connection-side fluid outlet sealing part can have at least one radially oriented sealing surface, in particular extending circumferentially and axially with respect to the axis, in particular the assembly axis. Advantageously, the at least one sealing surface can have the form of a cylinder shell, in particular a circular cylinder shell.

Finally, the object is achieved according to the invention with a device for separating a fluid in that between the at least one second gas passage and the at least one fluid outlet is disposed at least one housing-side fluid outlet sealing device, which sealingly interacts with at least one corresponding connection-side fluid outlet sealing part or a connecting part, which is provided for connecting the housing with the connection device.

Furthermore, the features and advantages associated with the housing according to the invention, the housing cover according to the invention, the connecting part according to the invention and the device according to the invention and all respective preferred embodiments thereof apply accordingly to one another and vice versa. Of course, the individual features and advantages can be combined with one another, whereby further advantageous effects can be configured which extend beyond the sum of the individual effects.

BRIEF DESCRIPTION OF THE DRAWINGS

Further advantages, features and details of the invention will become apparent from the following description in which exemplary embodiments of the invention with reference to the drawings are explained in more detail. A person skilled in the art will also appropriately consider the features disclosed in the drawings, the description and the claims individually and combine them into further sensible combinations. Shown schematically are:

DETAILED DESCRIPTION

In Reference to FIGS. 1 to 14

In FIGS. 1 to 8 is shown an air/oil separator apparatus 10 in various depictions, sections and detail views. The air/oil separator apparatus 10 serves for the separation from the air of such oil as is carried with the air. The air/oil separator apparatus is used, for example, in compressors, vacuum pumps compressed air systems or the like. It can be disposed before the inlet or after the outlet of a corresponding unit.

Figure 1:
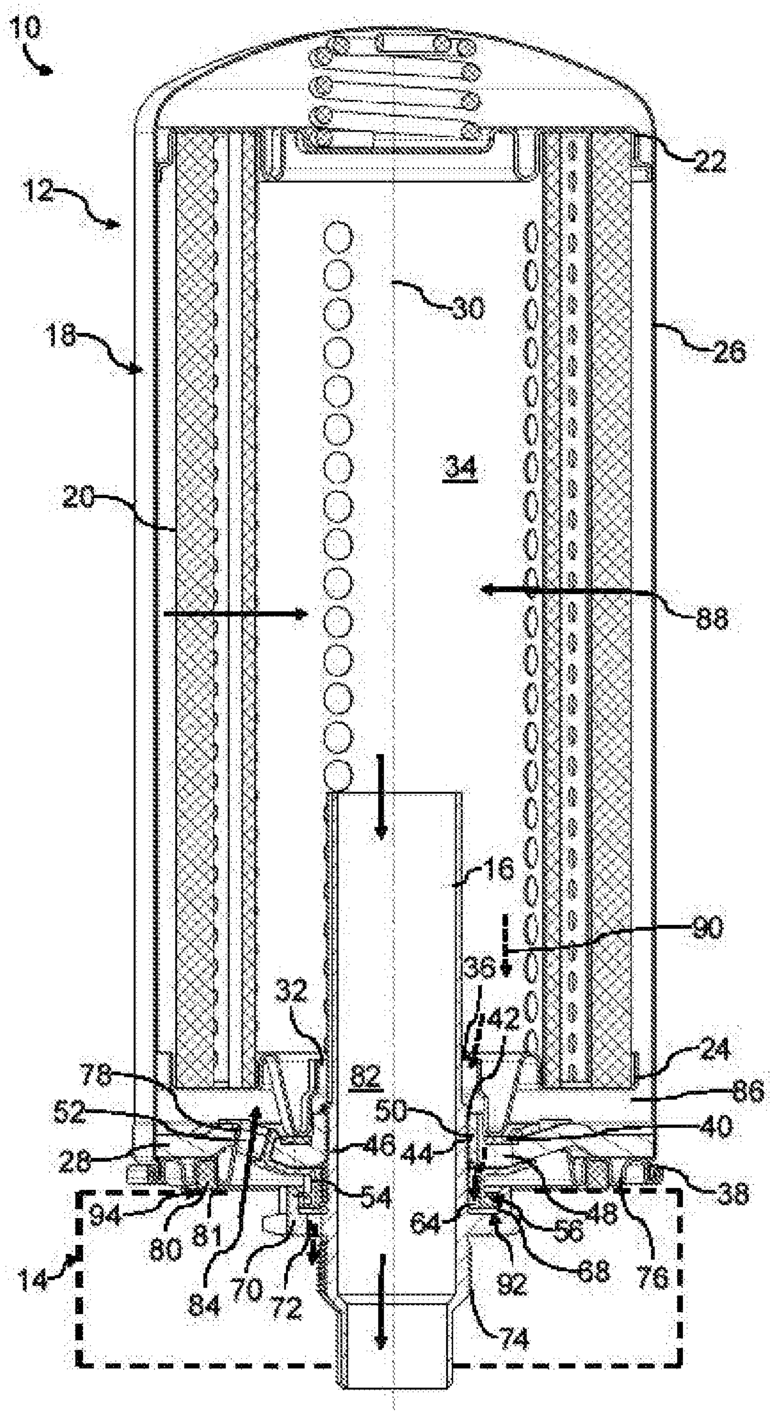
FIG. 1 shows a longitudinal section of an air/oil separator apparatus with an air/oil separator element according to a first exemplary embodiment, with a housing having a housing cover with a support ring and an oil outlet seal and a connection nipple, for connection with a connector head.

The air/oil separator apparatus 10 comprises an air/oil separator element 12, which can also be referred to as an air/oil separator box. The air/oil separator element 12 is replaceably fixed on a connector head 14, at the bottom of FIG. 1. The connector head 14 serves as a connection device for corresponding air lines and oil lines for connecting with the corresponding unit. In FIG. 1, the connector head 14 is only indicated schematically by dashed lines. A hollow, pipe stub-like connection nipple 16 connects the air/oil separator element 12 with the connector head 14. The interior of the connection nipple 16 is gas-conducting, in particular air-conducting.

The air/oil separator element 12 comprises a cup-shaped housing 18. In the housing 18 is disposed by way of example a filter element 20 designed as a ring-shaped coalescing element. By way of example, the filter element 20 has as a filter medium a glass fiber mat, which is repeatedly annularly wrapped and bounded by an upper end plate 22 and a lower end plate 24 facing the connector head 14. As a further filter medium, a non-woven material is disposed in the interior of the glass fiber wrap.

Figure 2:
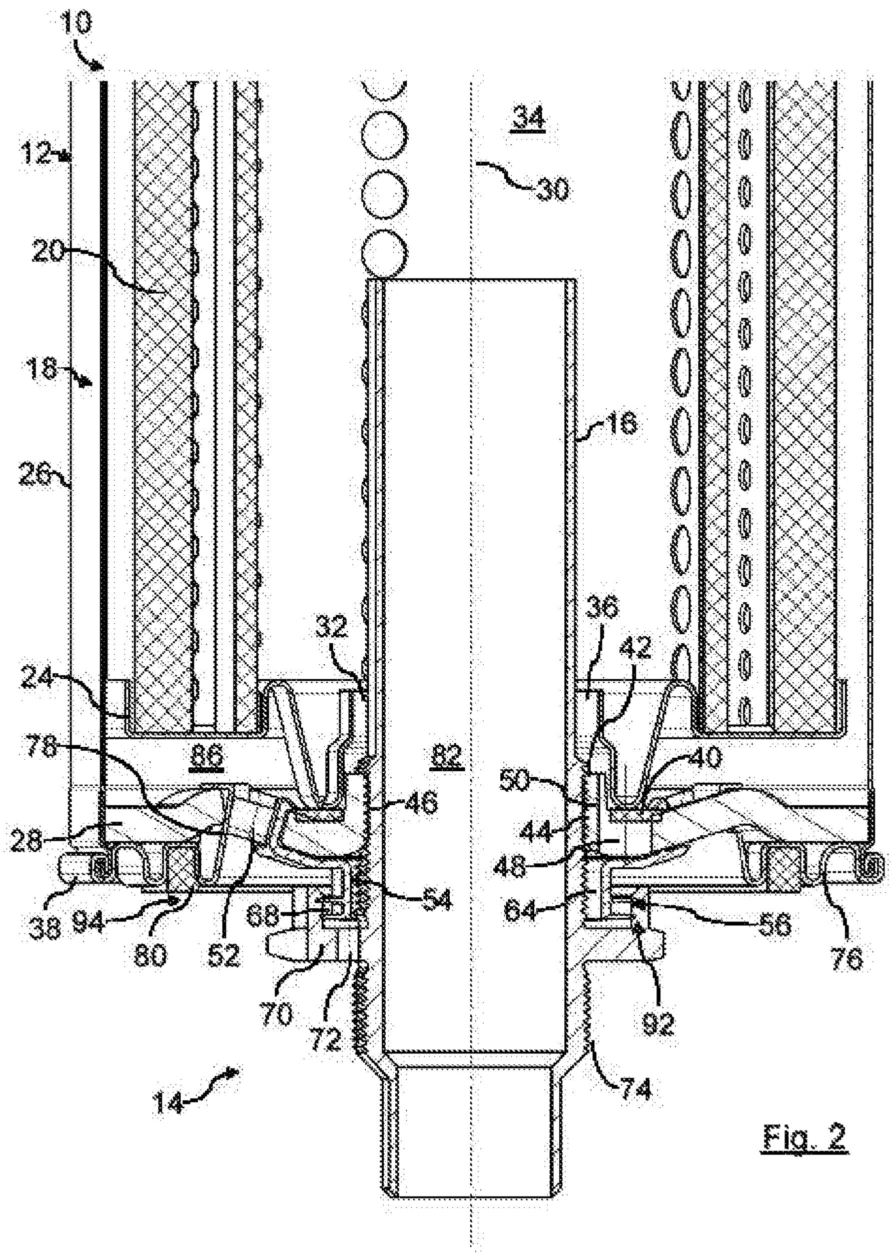
FIG. 2 shows a detail view of the air/oil separator apparatus of FIG. 1 in the region of the housing cover.

In general, the air/oil separator apparatus 10 is ready for use as disposed in the orientation shown in FIGS. 1 and 2. It can, however, also be disposed in other orientations. When further reference is made to “below,” “above,” or similar, this refers unless otherwise stated to the representation in FIGS. 1 and 2.

In Reference to FIGS. 1 to 14

The housing 18 comprises a housing vessel 26, the opening of which facing the connector head 14 is closed with a housing cover 28. The housing vessel 26 and the housing cover 28 are made, for example, of metal. Alternatively, at least one of the two components can be made from another material, for example plastic, or at least have another material.

The housing cover 28 is shown in detail in FIGS. 3 to 8. In an operation-ready assembly, the housing 18, the filter element 20 and the connection nipple 16 are respectively coaxial with an imaginary assembly axis 30. The air/oil separator element 12 can be screwed onto the connector head 14 and unscrewed therefrom about the assembly axis 30 by means of the connection nipple 16.

When further reference is made to “radial,” “axial,” “coaxial” or “circumferential” or the like, this refers unless otherwise stated to the assembly axis 30.

The lower end plate 24 facing the housing cover 28 is approximately annular. It has a coaxial pass-through opening 32 for the connection nipple 16. Radially between the pass-through opening 32 and the filter medium of the filter element 20, the lower end plate 24 is repeatedly bent, such that there is a circumferential annular trough, which opens toward the element interior 34 of the filter element 20.

The radially inner edge of the lower end plate 24 surrounds the pass-through opening 32. It points toward the element interior 34. An inner diameter of the pass-through opening 32 is larger than an outer diameter of the connection nipple 16 there. Between the radially outer peripheral wall of the connection nipple 16 and the radially inner edge of the pass-through opening 32, an annular, coaxial passage gap 36 remains for the separated oil.

The housing cover 28 is held on the housing vessel 26 by means of a retaining ring 76, as will be explained in greater detail below. The retaining ring 76 is connected by means of a flared connection 38 with the edge of the housing vessel 26.

The axial outside of the lower end plate 24 bounded by the annular trough extends over the filter medium in the axial direction. A bottoming of the annular trough-forming section of the outside of the lower end plate 24 sits peripherally connected in the axial direction to a dampening ring 40. The dampening ring 40 is supported on the axially opposite side on an inner side of the housing cover 28. The damping ring 40 is coaxial with the assembly axis 30. It serves inter alia to reduce noise as a so-called rattle guard. It restricts the axial movability of the filter element 20 in the housing 18 and thus prevents rattling noises. The dampening ring 40 can further serve as tolerance compensation and/or as dampening for operational vibrations or oscillations.

Figure 4:
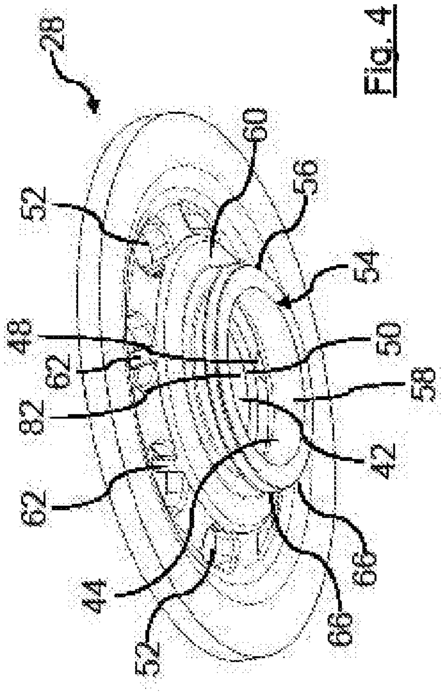
FIG. 4 shows the housing cover of FIGS. 1 to 3 with a view of the outside thereof.
Figure 3:
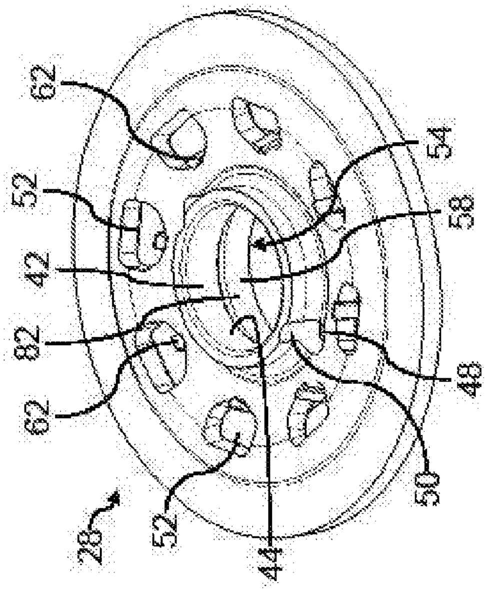
FIG. 3 shows an isometric view of the housing cover of FIGS. 1 and 2 with a view of the inside of the housing cover.
Figure 5:
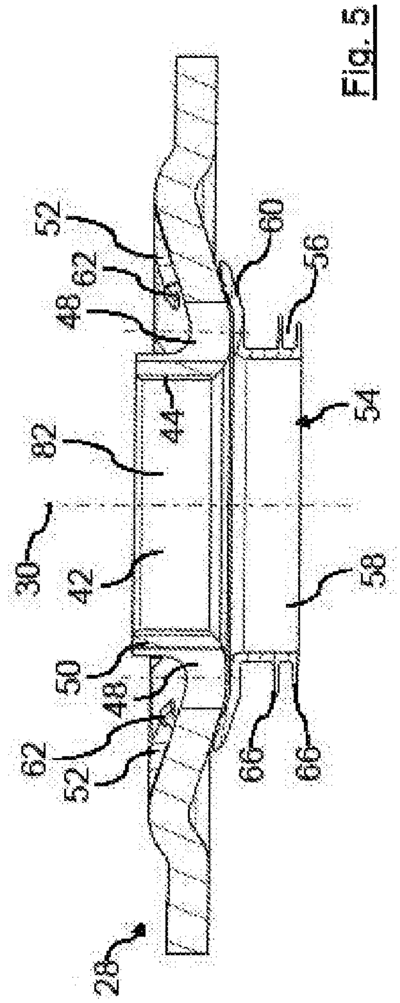
FIG. 5 shows a longitudinal section of the housing cover of FIGS. 1 to 4.
Figure 7:
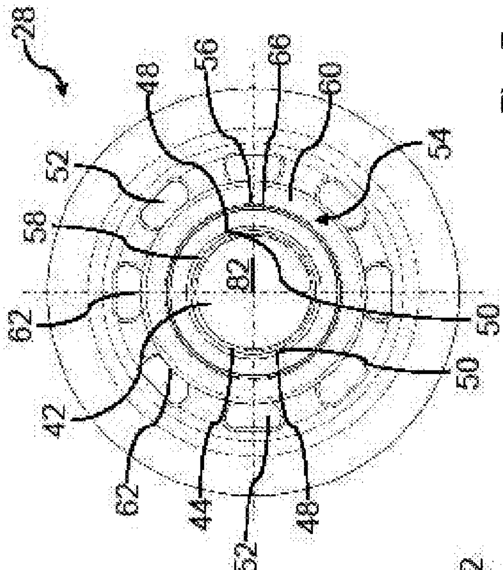
FIG. 7 shows a top view of the outside of the housing cover of FIGS. 1 to 6.
Figure 8:
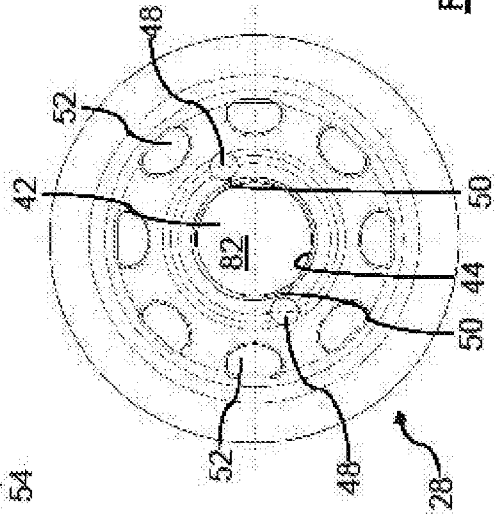
FIG. 8 shows a top view of the outside of the housing cover of FIGS. 1 to 7 without support ring and oil outlet seal.
Figure 6:
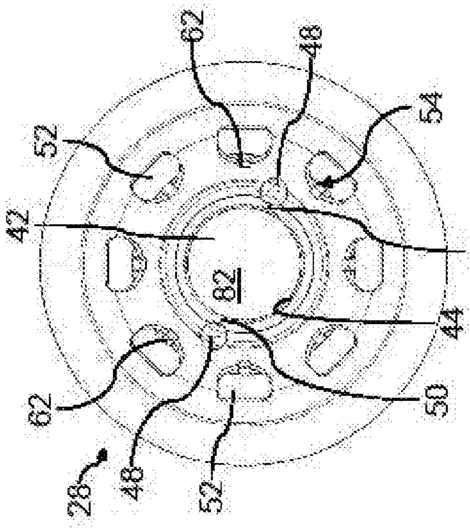
FIG. 6 shows a top view of the inside of the housing cover of FIGS. 1 to 5.
Figure 10:
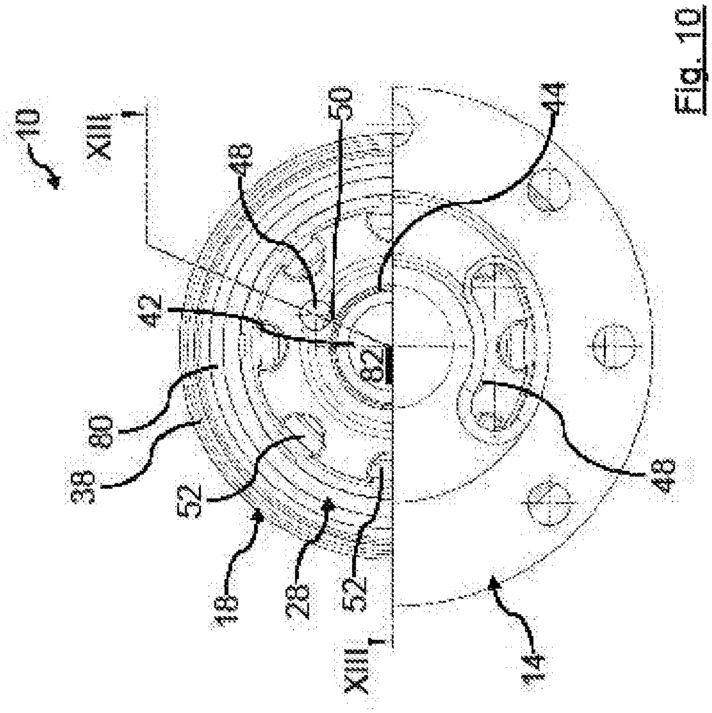
FIG. 10 shows the partial section of the air/oil separator apparatus of FIG. 9 without connection nipple, support ring and oil outlet seal.
Figure 9:
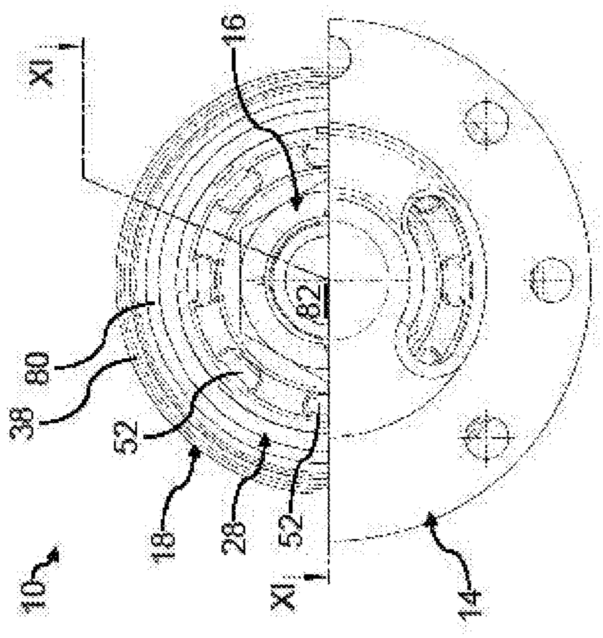
FIG. 9 shows a transverse partial section of an air/oil separator apparatus according to a second embodiment, which is similar to the air/oil separator apparatus of FIGS. 1 to 8, with a viewing direction from the connector head to the housing cover.
Figure 11:
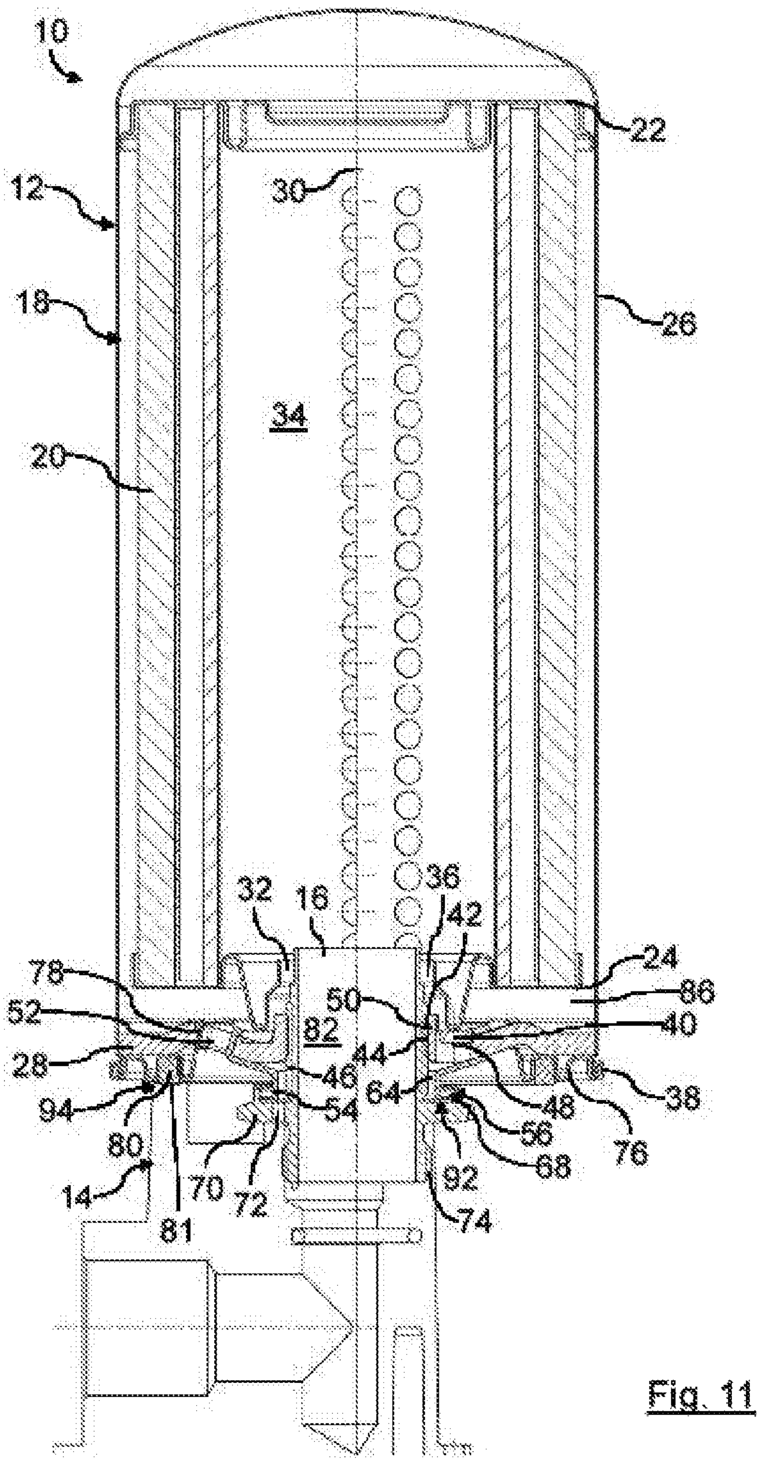
FIG. 11 shows a longitudinal section of the air/oil separator apparatus of FIG. 9 along the section line XI-XI.
Figure 12:
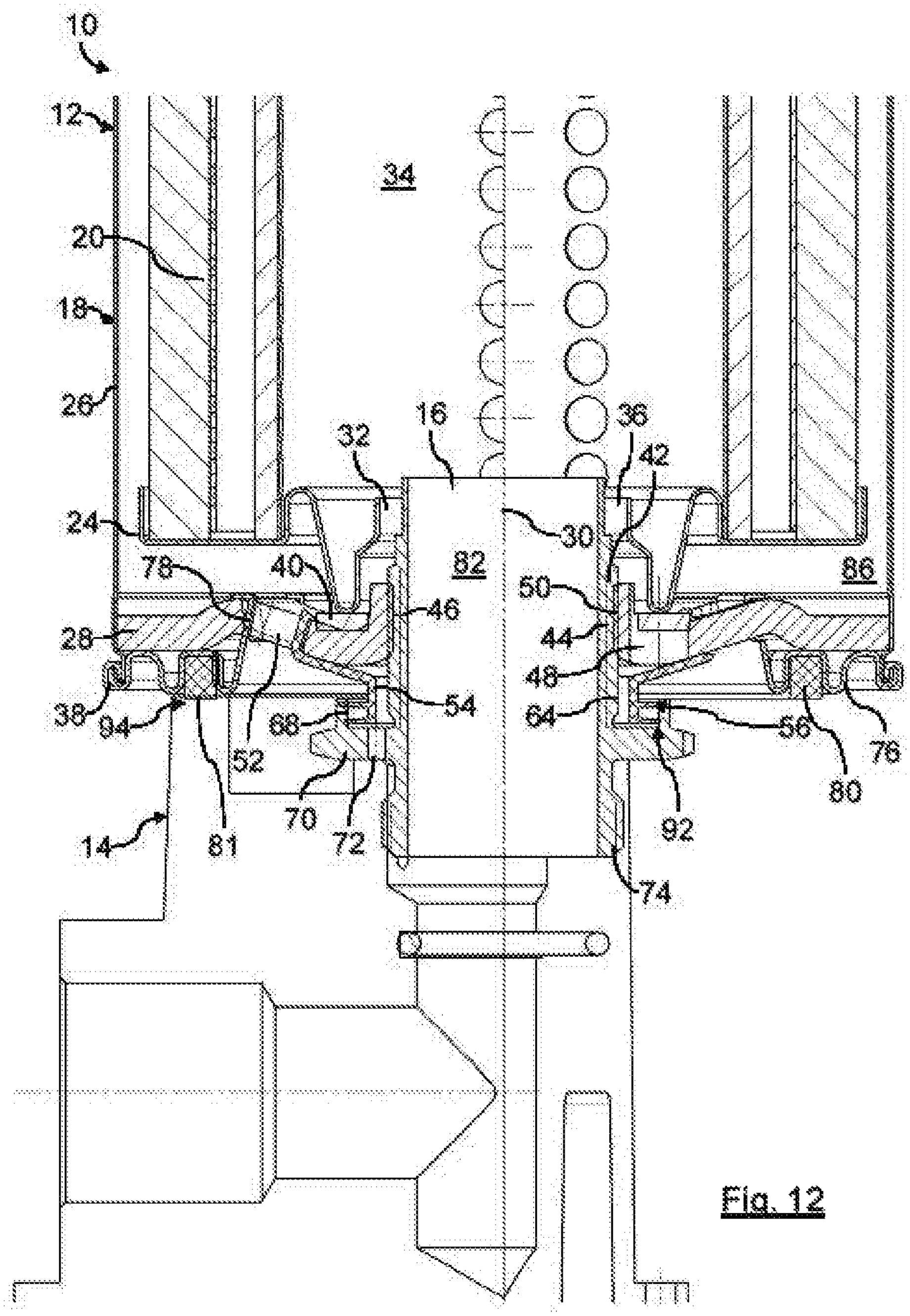
FIG. 12 shows a detail view of the longitudinal section of FIG. 11 in the region of the housing cover.
Figure 13:
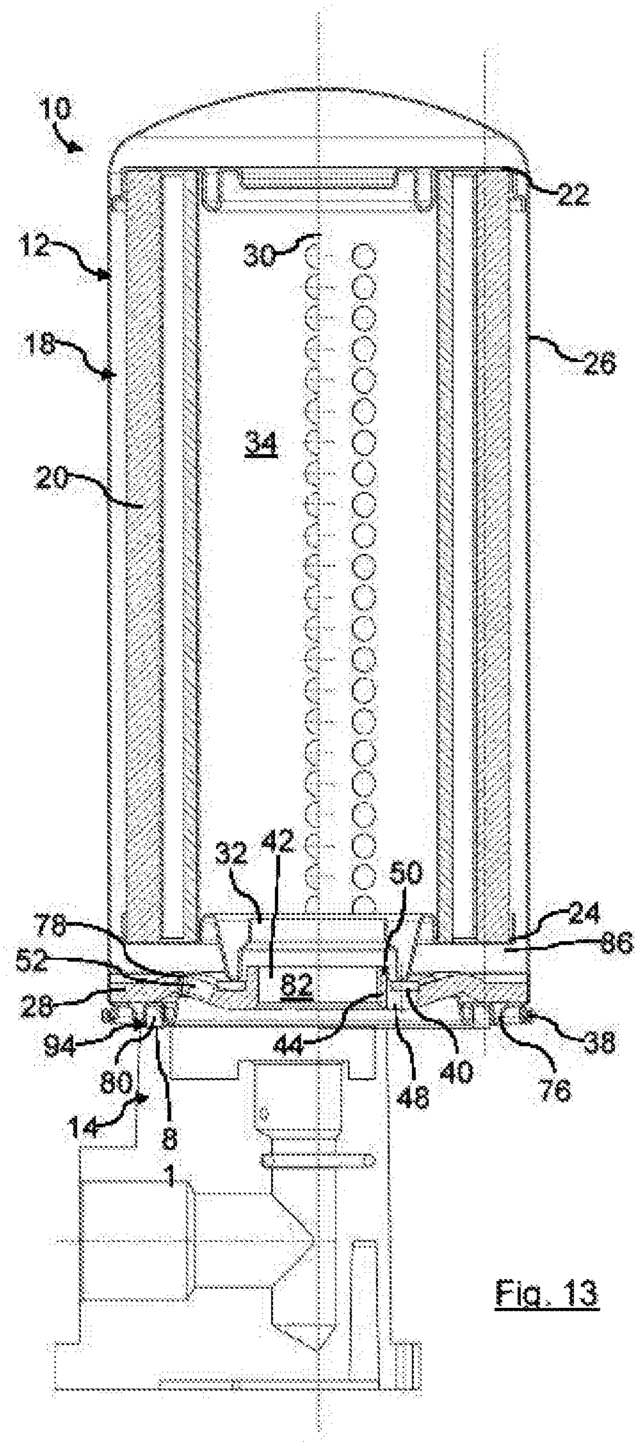
FIG. 13 shows a longitudinal section of the air/oil separator apparatus of FIG. 10 along the section line XIII-XIII.

The housing cover 28 is substantially circular. It is coaxial with the assembly axis 30. In profile, the housing cover 28, as shown in FIG. 4, is seen from radially outside to radially inside as bent in an approximate S-shape.

In its center, the housing cover 28 has a coaxial assembly opening 42 for the connection nipple 16. A radially inner peripheral wall of the housing cover 28 surrounding the assembly opening 42 is equipped with an inner thread 44. The inner thread 44 mates with a corresponding outer thread 46 on the radially outer peripheral side of the connection nipple 16.

Radially outside the assembly opening 42, the housing cover 28 has two respective oil outlet holes 48 which pass through. The oil outlet holes 48 are disposed on radially opposite sides with respect to the assembly axis 30. Their axes are parallel to the assembly axis 30. The oil outlet holes 48 are materially technically separated from the assembly opening 42 by means of a circular cylindrical, coaxial web portion 50.

Along an imaginary coaxial circumference which encloses both oil outlet holes 48, a plurality of air inlet holes 52 which pass through are disposed. The air inlet holes 42 are respectively flattened on their radially outer peripheral sides. Imaginary axes of the air inlet holes 52 extend parallel to the assembly axis 30.

On the exterior side facing away from the filter element 20, a coaxial support ring 54 is fixed on the housing cover 28. The support ring supports an oil outlet seal 56. The support ring 54 is made of plastic. Instead of plastic, it can also be made of a different material, for instance metal, or at least have a different material.

The support ring 54 has a coaxial hollow cylindrical section 58. On its end face facing the housing cover 28, the hollow cylindrical section 58 changes over as a single piece to a coaxial radial ring section 60. The radial ring section 60 extends continuously circumferentially and somewhat radially outside the hollow cylindrical section 58. The profile of the radial ring section 60 is fitted to the outer side of the housing cover 28.

In the region of its radially outer edge, a plurality of locking arms 62 are each integrally connected with the radial ring section 60. The locking arms 62 extend approximately parallel to the assembly axis 30 away from the hollow cylindrical section 58 to the side opposite the hollow cylindrical section 58. Each locking arm 62 has a radially inwardly oriented locking lug on its free end. The locking arms 62 extend respectively through one of the air inlet holes 52 through the housing cover 28. They engage with their locking lugs on the radially inner side of the air inlet holes 52 on the inner side of the housing cover 28.

An inner diameter of the hollow cylindrical section 58 and the radial ring section 60 is somewhat larger than the inner diameter of the assembly opening 42, in particular the inner thread 44. The oil outlet holes 48 project radially inward beyond the support ring 54 such that they are connected with an interior of the support ring 54 surrounded by the hollow cylindrical section 58.

In the assembled state shown in FIGS. 1 and 2, the radially inner circumferential side of the hollow cylindrical section 58 of the support ring 54 is spaced apart from the radially outer circumferential side of the connection nipple 16 such that an annular gap 64 arises between the corresponding circumferential sides as a passage for the separated oil.

In the region of the free edge of the hollow cylindrical section 58 which faces away from the housing cover 28, two sealing lips 66 are disposed on the radially outer circumferential side of the hollow cylindrical section 58. The sealing lips 66 are part of the oil outlet seal 56. The sealing lips 66 each extend continuously circumferentially and away from the hollow cylindrical section 58 from radially inward to radially outward. The seal lips 66 extend parallel to each other. The axially inner sealing lips 66 facing the housing cover 28 extend radially outward over the other, axially outer sealing lips 66. The sealing lips 66 are elastic. The sealing lips 66 can, for example, be realized with the support ring 54 as a two-component part.

In the assembled air/oil separator element 12, the sealing lips 66, as are shown in FIGS. 1 and 2, are located with their radially inner edges radially sealing against a radially inner circumferential side of a circumferential connection-side sealing surface 68. The connection-side sealing surface 68 is in the form of a coaxial circular cylinder shell. The connection-side sealing surface 68 is realized on a coaxial hollow cylindrical wall section of a coaxial annular collar 70 of the connecting means 16.

The annular collar 70 is disposed circumferentially on the radially outer circumferential side of the connector nipple 16. On the side axially facing the housing cover 28, the ring collar 70 forms an in open, annular groove which is U-shaped in profile, for receiving the cylindrical section 58 with the sealing lips 66 of the support ring 54.

A connection-side oil passage opening 72 leads through an end wall of the annular collar 70 which forms the bottom of the "U." In an assembled air/oil separator apparatus 10, the connection-side oil passage opening 72 connects the annular gap 64 with an oil outlet channel of the connector head 14, not shown in FIGS. 1 and 2.

On the side of the ring collar 70 axially opposite to the outer thread 46, the connection nipple 16 has a connecting outer thread 74 on its radially outer circumferential side, with which the connection nipple 16 is screwed into a corresponding connection-side inner thread of the connector head 14, which is also not shown in FIGS. 1 and 2.

The retaining ring 76 which is, for example, made of sheet metal and bent several times in the radial direction, is radially outwardly connected with the flared connection 38 to the housing vessel 26. The retaining ring 76 holds the housing cover 28 on the outside thereof. On its radially inner edge, the retaining ring 76 has retaining tabs 78, which extend respectively through one of the air inlet holes 52 of the housing cover 28, and which are bent on the inner side thereof. The housing cover 28 is held on the retaining ring 76 with the retaining tabs 78.

Further, radially within the flared connection 38, the retaining ring 76 comprises a coaxially annularly-shaped, circumferentially continuous sealing groove, in which is disposed a coaxial surrounding ring seal 80. The surrounding ring seal 80 radially outwardly surrounds the air inlet holes 52. In the assembled air/oil separator element 12, the surrounding ring seal 80 is located axially sealingly on a corresponding terminal-side annularly-shaped coaxial surrounding sealing surface 81 of the connector head 14, as is shown in FIG. 1. The surrounding sealing surface 81 extends circumferentially and radially. It seals the air inlet holes 52, i.e. the raw air side, toward the surrounding.

The assembly opening 42 of the housing cover 28 further defines an air outlet opening 82. The interior of the connection nipple 16 extends through the air outlet opening 82, thus co-defining the course of the air outlet opening 82 in the assembled state. The interior of the connection nipple 16 forms or bounds in so many words the effective flow cross-section of the air outlet opening 82.

During operation of the air/oil separator apparatus 10, air, which can be loaded with oil droplets, flows from an air inlet line of the connector head 14 through the air inlet holes 52, indicated by an arrow 84 in FIG. 1, into an inlet chamber 86 of the housing 18. the lower part of the inlet chamber 86 is located in the housing 18 between the lower end plate 24 and the housing cover 28, and extends circumferentially radially outward about the filter element 20.

The air flows through the filter medium of the filter element 20 from radially outward to radially inward, indicated by arrow 88. The oil droplets are deposited on the radially inner circumferential side of the filter element 20, and flow downward following gravity, indicated in FIG. 1 by dashed arrows 90.

The air, free of oil droplets, flows in the clean air side through the central air outlet opening 82 in the inner space of the connection nipple 16 out of the air/oil separator element 12, and enters an air outlet channel of the connector head 14, not shown in FIGS. 1 and 2.

The separated oil droplets pass through the passage gap 36 and the oil outlet holes 48 of the housing cover 28 into the annular gap 64. From the annular gap 64, the oil passes through the connection-side oil passage opening 72 into the oil outlet channel of the connector head 14.

The oil outlet seal 56 and the connection-side sealing surface 68 form an oil outlet sealing device 92, which separates the oil outlet with the oil-bearing annular gap 64 and the oil outlet holes 48 from the raw air side, in particular the air inlet with the air inlet holes 52.

The assembly of the air/oil separator apparatus 10 can take place in different ways.

According to a first exemplary method, the connection nipple 16 can then be screwed into the assembly opening 42 of the housing cover 28. Here, the sealing lips 66 slide inwardly along the connection-side sealing surface 68 until they have reached their end position. No substantial axial forces act on the sealing lips 66. In this way, the air/oil separator element 12 can be pre-assembled with the connection nipple 16. Then, the air/oil separator element 12 can be screwed with the free end of the connection nipple 16 forward axially into the corresponding inner thread of the connector head 14. The surrounding ring seal 80 is pressed axially between the housing cover 28 and the connection-side surrounding ring seal surface 81. The surrounding ring seal 80 forms a surrounding seal device 94 with the surrounding ring seal surface 81.

According to a second exemplary method, the connection nipple 16 can then be screwed into the corresponding inner thread of the connector head 14. Then, the air/oil separator element 12 can be screwed with the housing cover 28 forward coaxially to the assembly axis 30 onto the connection nipple 16. The oil outlet sealing device 92 and the surrounding sealing device 94 are thereby respectively activated.

For removal, the air/oil separator element 12 is either screwed off from the connection nipple 16 with respect to the assembly axis 30, or the air/oil separator element 12 is screwed off together with the connector nipple 16 from the connector head 14.

In FIGS. 9 to 13 is shown a second exemplary embodiment of an air/oil separator apparatus 10 in various representations. In the second exemplary embodiment, an axial extension of the connector nipple 16 in the element interior 34 is less than in the first exemplary embodiment of FIGS. 1 to 8. Further, the connector head 14 is shown in more detail in the second exemplary embodiment.

Figure 14:
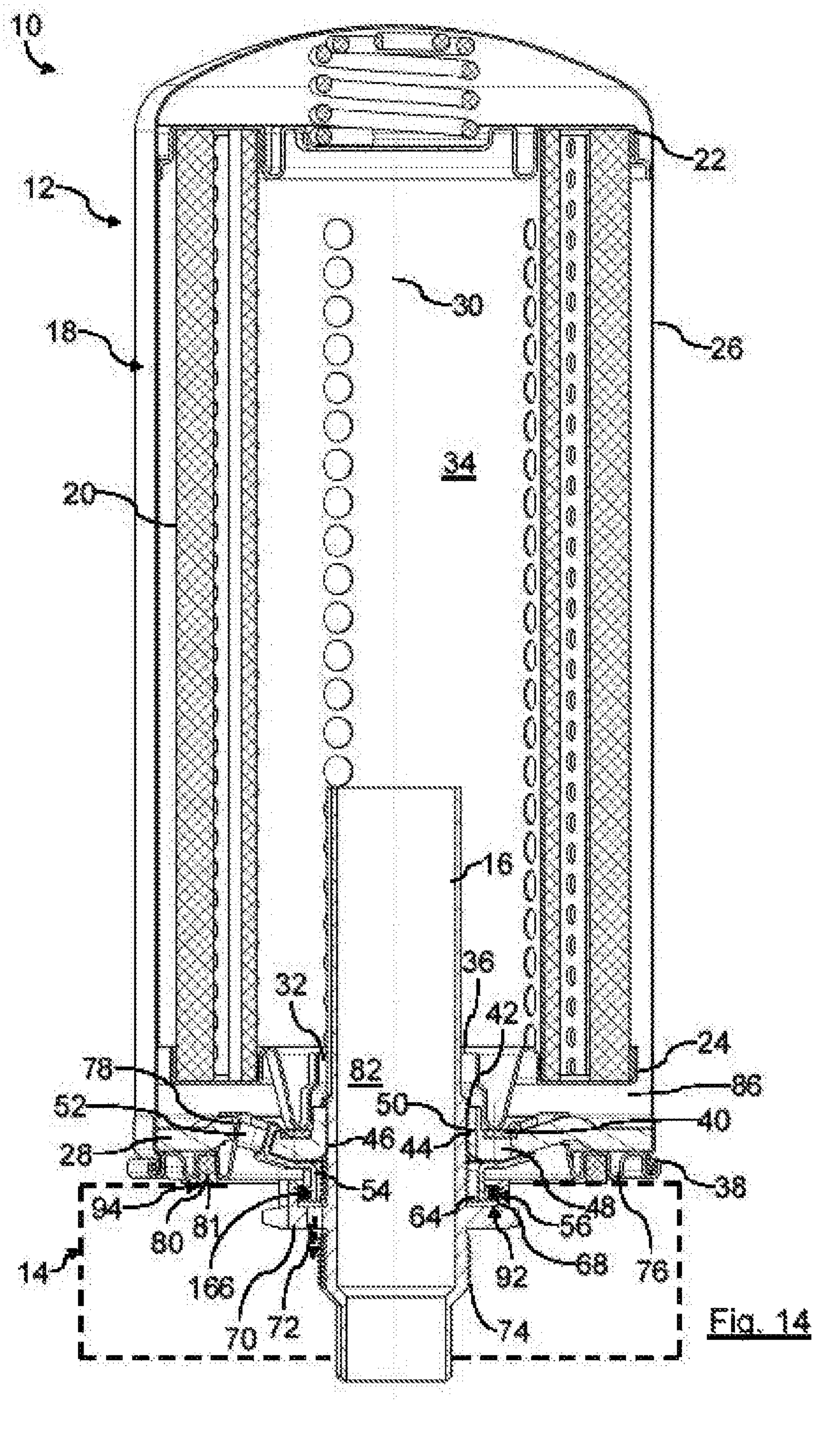
FIG. 14 shows a longitudinal section of an air/oil separator apparatus according to a third exemplary embodiment, in which the oil outlet seal has an O-ring seal.

In FIG. 14 is shown a third exemplary embodiment of an air/oil separator apparatus 10. Unlike the first exemplary embodiment, the oil outlet seal 56 in the second exemplary embodiment has an O-ring seal 166 instead of the sealing lips. The O-ring seal 166 is disposed in a corresponding sealing groove on the radially outer circumferential side of the hollow cylindrical section 58 of the support ring 54. The O-ring seal 166 seals analogously to the sealing lips 66 of the first two exemplary embodiments against the connection-side sealing surface 68 in the radial direction.

In Reference to FIGS. 15 to 22

In the third embodiment of the invention illustrated in FIGS. 15 through 22, an air/oil separator apparatus 100 for separating liquid from air is illustrated. The air/oil separator apparatus 100 has a cup-shaped housing assembly 10 wherein the basic member of the cup-shaped housing assembly 10 is preferably a cup-shaped housing body or housing cup 11. The cup-shaped housing body or housing cup 11 has a housing bottom 41 and an open end face. A filter element is arranged in the interior of the housing assembly 10, or its housing body 11, wherein the filter element is, for example, a so-called spin-on filter, and is embodied as an annular coalescing element. As a filter medium, the filter element comprises glass fiber material 210 that is configured in a multi-coiled annular arrangement and delimited by two end disks 30, 40. As a further filter medium, in the interior of the glass fiber coil 210 a nonwoven 220 is arranged.

For closing its open end face, the cup-shaped housing assembly 10 has a housing cover 20. This housing cover 20 has an opening 21 (see FIG. 18) for discharging the filtered clean air. This opening 21 is arranged centrally in the housing cover 20. The area of the housing cover 20 that surrounds the opening 21 is substantially cylindrical, in particular of a circular cylinder shape, for example, designed as an annular collar of the housing cover.

The opening 21 receives the nipple 50 which extends through the housing cover 20 in the direction of the longitudinal axis of the cup-shaped housing assembly 10 and of the housing body 11. The housing cover 20 is detachably connectable to the nipple 50.

The connecting section 26 of the housing cover 20 that is detachably connectable to the nipple 50 is designed such that, in the connected state of the housing cover 20 with the nipple 50, at least one liquid drain 28, for example, an oil passage or a connecting passage, is disposed between housing cover 20 and nipple 50 for draining the separated liquid from the interior 70 of the cup-shaped housing assembly 10.

As illustrated in FIGS. 15 through 19, the liquid drain 28 can be formed by at least one groove or channel-like recess 28 of the connecting section 26 of the housing cover 20 that is connectable to the nipple 50 and that is, for example, an inner thread of the housing cover 20. The groove or recess 28 extends in axial direction from the inner side 24 of the housing cover 20 that is facing the interior 70 of the cup-shaped housing assembly 10 to the outer side 25 of the housing cover 20 which is facing away from the interior 70 of the cup-shaped housing assembly 10.

The liquid drain 28 can be, for example, formed by a drainage groove which is arranged in the thread (not illustrated) of the housing cover 20 and/or in the thread (not illustrated) of the nipple 50.

As an alternative to a screw connection, the nipple 50 can also be connected by means of a bayonet coupling with the housing cover 20.

The liquid drain 28 enables between nipple and housing cover a permanent drainage or emptying in the completely connected state, for example, screwed-on state, of nipple 50 and housing cover 20.

The liquid drain 28 is correlated with the clean air side of the cup-shaped housing assembly 10. The liquid collects in the collecting chamber 230 that is embodied preferably as a depression in the open end disk 40 of the filter element 210, 220 and is formed at least partially by the annular projection 42.

For draining the separated liquid, the drain 28 is connected with a drainage channel 86 of the connecting head 80.

For supply of raw air to the cup-shaped housing assembly 10, the housing cover 20 has at least one raw air inlet 22, 23 which is arranged off-center. The flow of the air is indicated in FIG. 1 by means of arrows in dashed lines. To avoid crowding of the drawing, the arrows are only shown in the left half of the drawing. For sealing the raw air side relative to the environment, a seal 61 is provided that can be contacted and compressed in axial direction relative to the connecting head or socket 80. The seal 61 is usually an annular seal and is attached to the housing cover 20.

At a spacing to the housing cover 20 a collar 54 extending in radial direction is provided on the nipple 50. Between housing cover 20 and collar 54, a seal 60 is provided that seals the raw air inlet 22, 23 relative to the liquid drain 28.

Figure 15:
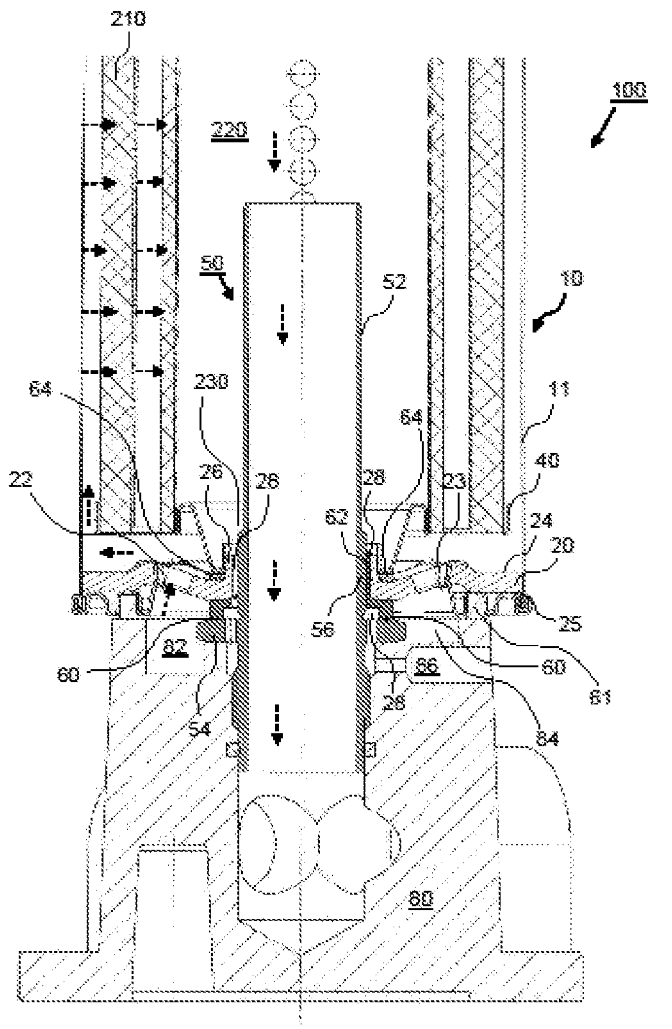
FIG. 15 shows in a schematic section illustration a third exemplary embodiment of an air/oil separator apparatus according to the invention with a cup-shaped housing assembly according to the invention that is mounted in accordance with the method according to the invention.
Figure 16:
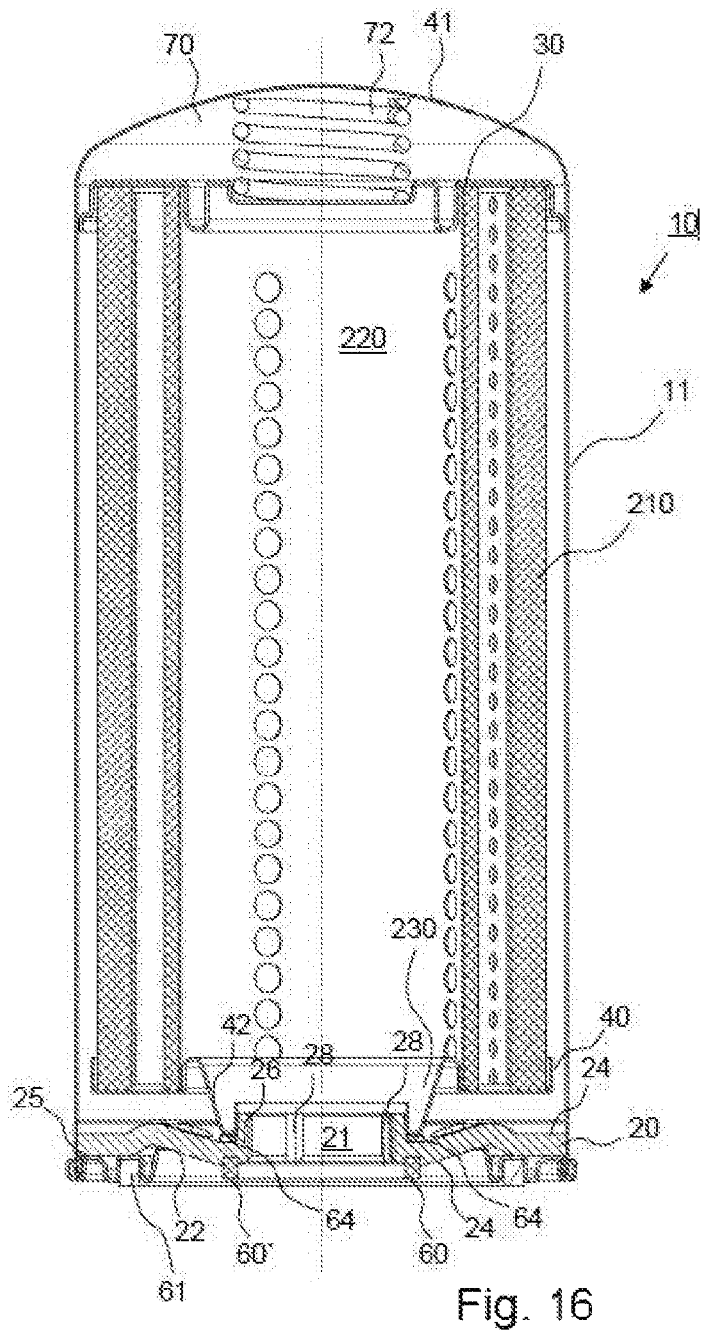
FIG. 16 shows in a schematic section illustration the cup-shaped housing assembly of the air/oil separator apparatus of FIG. 15 in a second embodiment of a seal.
Figure 17:
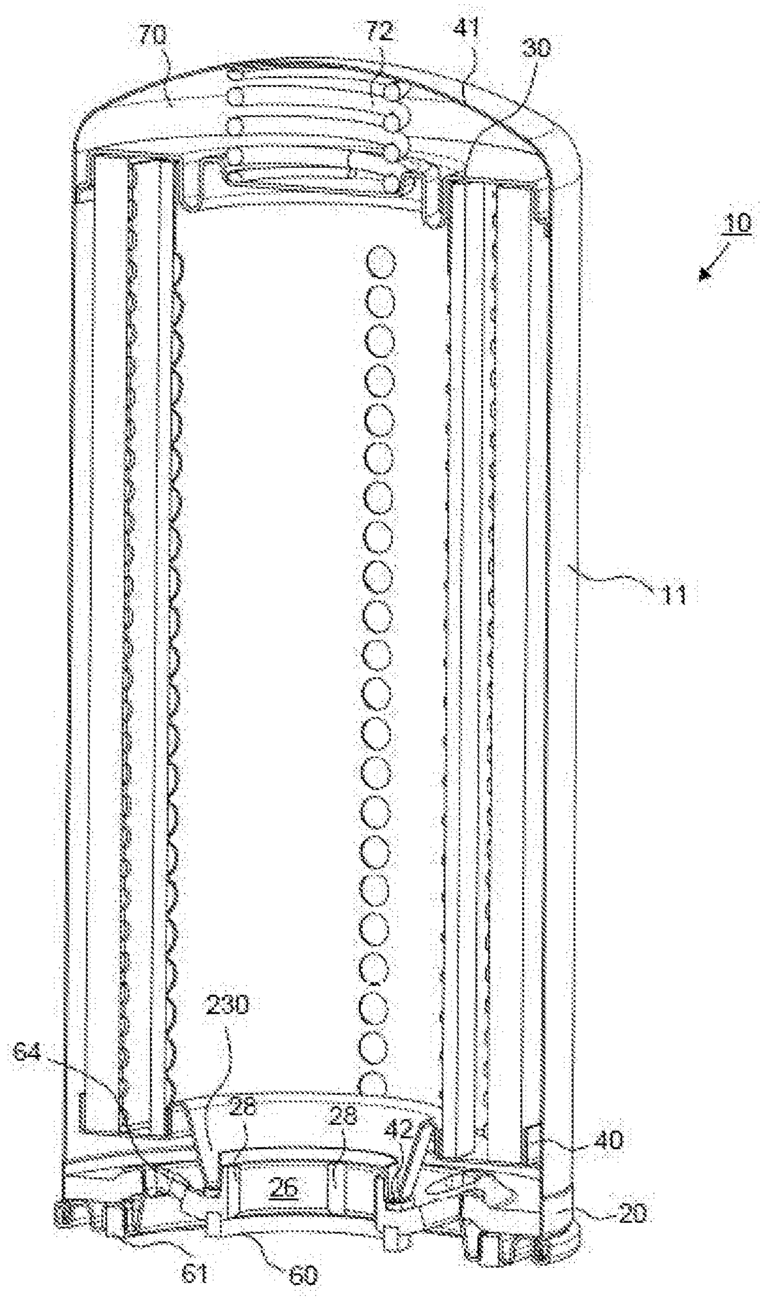
FIG. 17 shows in a perspective section illustration the cup-shaped housing assembly of the air/oil separator apparatus of FIG. 16.
Figure 18:
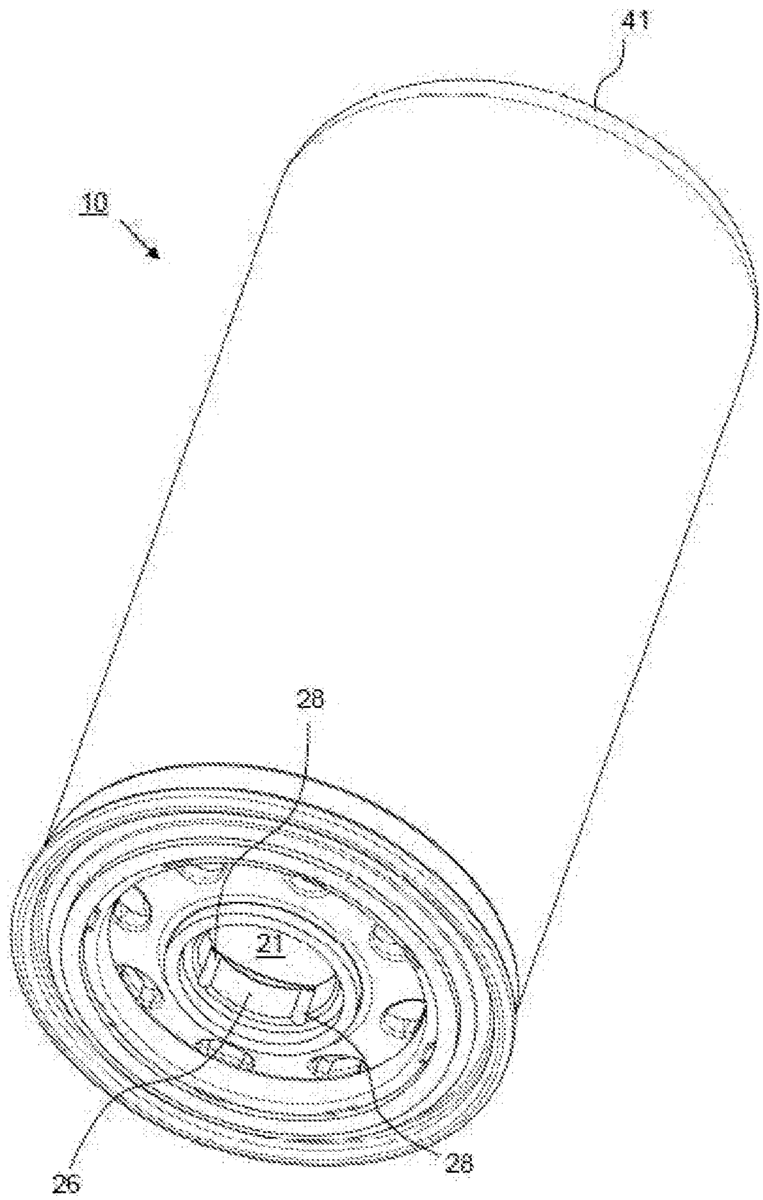
FIG. 18 is an isometric illustration of the cup-shaped housing assembly of the air/oil separator apparatus of FIG. 15.
Figure 19:
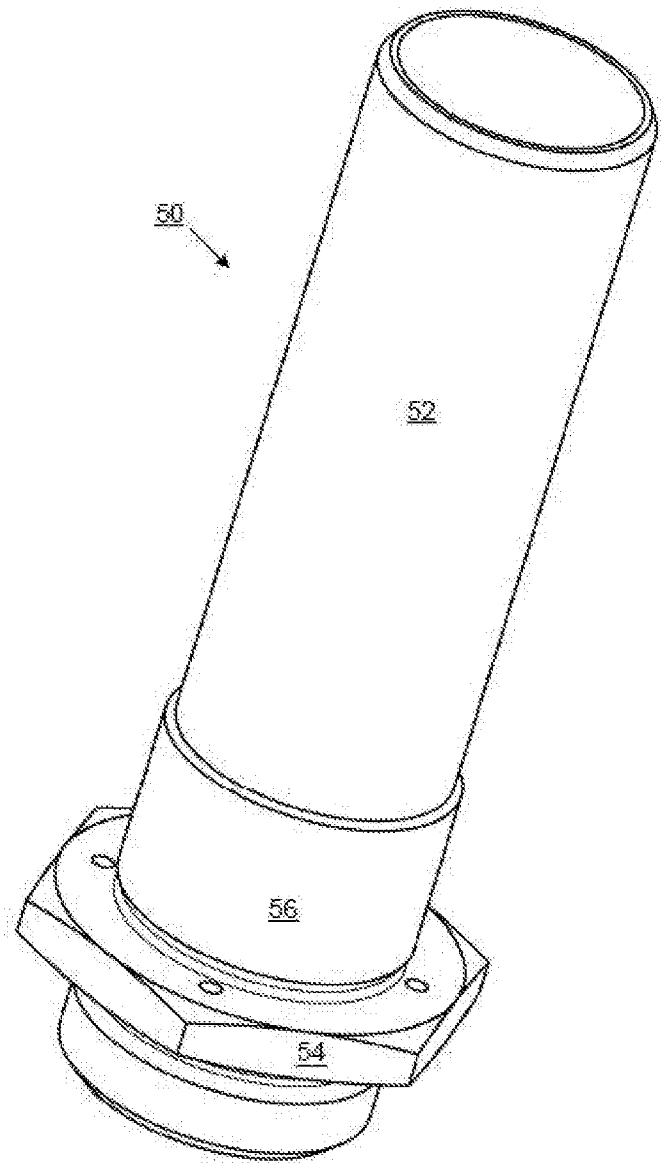
FIG. 19 is an isometric illustration of the nipple of the air/oil separator apparatus of FIG. 15.
Figure 20:
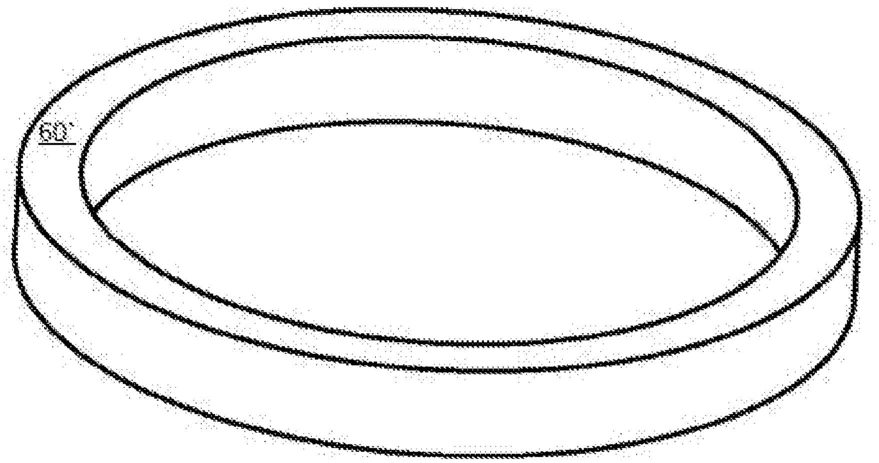
FIG. 20 is an isometric illustration of a detail view of the seal of the cup-shaped housing assembly of FIGS. 16 and 17.
Figure 21:
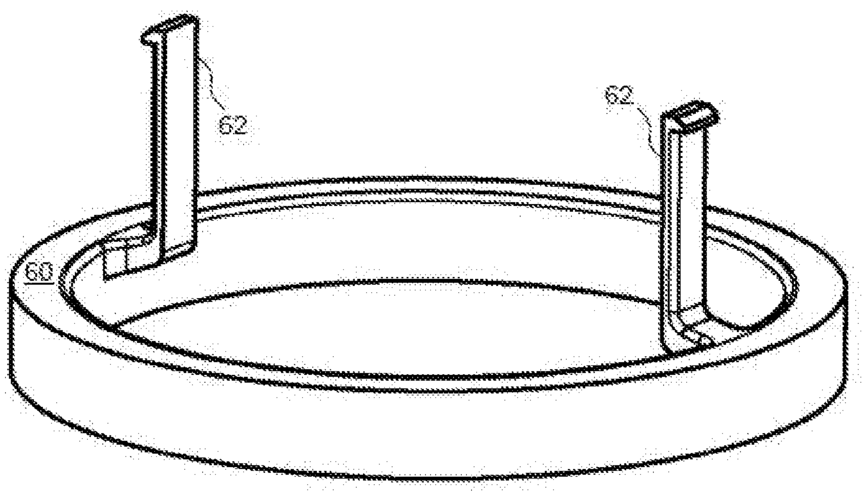
FIG. 21 is an isometric illustration of the seal of the device of FIG. 15.
Figure 22:
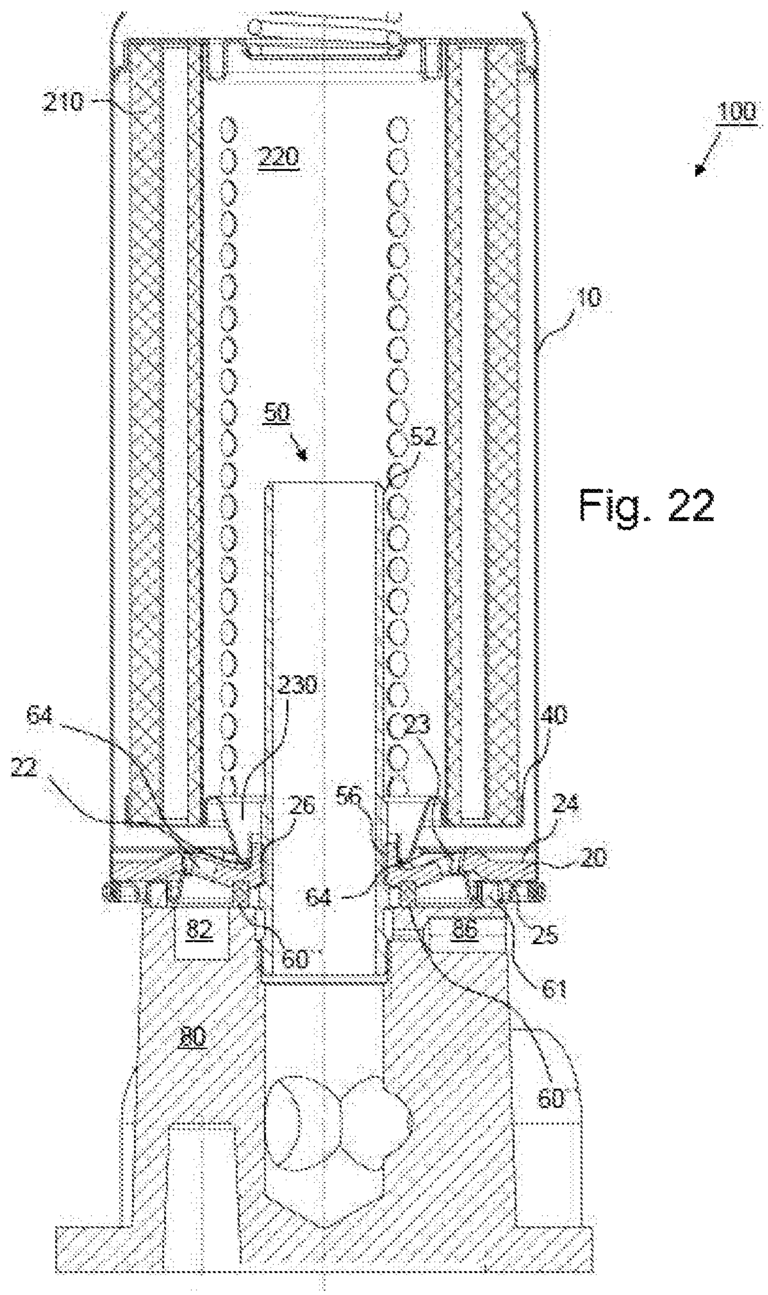
FIG. 22 shows a partial plan view of an alternative embodiment of the housing cover of the cup-shaped housing assembly of FIG. 17.

The seal 60, as illustrated in FIG. 15, can be provided with a fixation nose that extends in the direction of the longitudinal axis of the cup-shaped housing assembly 10 for clamping the sealing surface 60 on the housing cover 20. In this context, the fixation nose 62 is arranged in a liquid drain 28.

In addition to the sealing surface 60 arranged at the outer side 26 of the housing cover 20 that is facing away from the interior 70 of the cup-shaped housing assembly 10, the cup-shaped housing assembly 10, for sealing between the liquid drain 28 and the raw air inlet 22, has also at least one seal 64 which is arranged on the inner side 24 of the housing cover 20 which is facing the interior 70 of the cup-shaped housing assembly 10. This further seal 64 in the illustrated embodiment is arranged between an annular projection 42 of an end disk 40 at an end face of the cup-shaped housing assembly 10 and the inner side 24 of the housing cover 20.

For discharging the clean air from the cup-shaped housing assembly 10, the nipple 50 has a central clean air outlet 52 which is monolithically formed with the nipple 50. The clean air outlet 52 extends into the filter element 210, 220 in particular approximately to the center of the filter element 210, 220.

On the side of the nipple which is facing away from the cup-shaped housing assembly 10, the nipple is detachably connectable with a connecting head 80 for connecting the air/oil separator apparatus 100 to a component of a power machine.

In contrast to the prior art, the nipple 50 is therefore formed only of a single part instead of, as is conventional, being comprised of the nipple body and an inserted additional tube for providing an annular gap as a liquid drain. In contrast to the prior art, in the embodiment of the invention illustrated in FIGS. 15 to 21 there is no sealing seat and no O-ring within the corresponding spin-on filter. In this way, a further cost advantage is provided. In order to still have a sealing action between the drain and the raw side, an additional sealing surface 60 is provided, for example, a plastic seal.

Reference Characters used in FIGS. 15 Through 22

In regard to FIGS. 15 through 21, the reference characters that are employed herein and the elements to which they refer are explained briefly in the following.

Number 10 refers to a cup-shaped, in particular hood-shaped or circular cylindrical cup-shaped housing assembly of the air/oil separator apparatus 100, in particular an air/oil separator box, for example, the housing of a spin-on filter.

Number 11 is the housing cup or housing body as a basic member of the housing assembly 10.

Number 20 refers to the housing cover that closes off the cup-shaped housing body 11 of the housing assembly 10.

Number 21 refers to an opening of the housing cover 20, in particular a centrally arranged opening of the housing cover 20.

Number 22 refers to a first raw air inlet, in particular a first off-center passage of the housing cover 20 for the incoming raw air.

Number 23 refers to a further raw air inlet, in particular a further off-center passage, of the housing cover 20 for supply of raw air.

Number 24 refers to an inner side of the housing cover 20 which is facing the interior 70 of the cup-shaped housing assembly 10.

Number 25 refers to the outer side of the housing cover 20 which is facing away from the interior 70 of the cup-shaped housing assembly 10.

Number 26 identifies the connecting section that is detachably connectable to the nipple 50 and that is in particular an inner thread, for example, of an annular collar of the housing cover 20.

Number 28 refers to a liquid drain arranged between housing cover 20 and nipple 50 that is in particular a drain groove or spiral recess in the connecting section 26 of the housing cover 20 that is connectable with the nipple 50. For example, it is a drain groove or spiral recess in the inner thread of the housing cover 20, for example, a thread of the housing cover 20 that is cut deeper into the housing cover.

Number 30 refers to a bottom-side end disk of the filter element.

Number 40 refers to an end disk at the opposite end face of the filter element.

Number 41 refers to the closed housing bottom of the cup-shaped housing body 11 of the housing assembly 10.

Number 42 is an annular projection of the end disk 40.

Number 50 indicates a nipple for detachable connection of the cup-shaped housing assembly 10 with a connecting head 80 of a power machine, in particular a compressor, for example, a compressed air compressor. In particular, the nipple 50 is an axial screw-on nipple, for example, a tubular socket, for example, a threaded tubular socket (first embodiment, see FIGS. 15-21).

Number 52 is a clean air outlet of the nipple 50 for discharging the clean air from the cup-shaped housing assembly 10, in particular a central passage for discharging the clean air.

Number 54 is a radial projection, in particular collar, of the nipple 50.

Number 56 is a connecting section of the nipple that is detachably connectable to the cup-shaped housing assembly 10, in particular with the housing cover 20; connecting section 56 is, for example, an outer thread of the nipple 50.

Number 60 is a sealing surface, in particular a seal, for example, an annular seal (see FIG. 15), arranged at the outer side 26 of the housing cover 20 that is facing away from the interior 70 of the cup-shaped housing assembly 10.

Number 61 is the outer sealing surface, in particular a seal, for example, annular second seal for sealing the raw air side or the raw air inlet relative to the environment.

Number 62 is a fixation element, for example, a fixation nose, extending in the direction of the longitudinal axis of the cup-shaped housing assembly 10 for clamping the sealing surface 60 on the housing cover 20.

Number 64 indicates a seal for sealing between liquid drain 28 and raw air inlet 22, the seal being arranged at the inner side 24 of the housing cover 20 which is facing the interior 70 of the cup-shaped housing assembly 10.

Number 70 refers to the interior of the cup-shaped housing assembly 10.

Number 72 is a spring, for example, a coil pressure spring.

Number 80 refers to a connecting head, in particular a receiving head or a separator head or receiving flange, for connecting the air/oil separator apparatus 100 to a component of a power machine, in particular a compressor, for example, a compressed air compressor.

Number 82 refers to a first raw air inlet of the connecting head 80 that is in particular a first passage that is off-center and in particular provided for inflow of raw air.

Number 84 refers to a further raw air inlet of the connecting head 80 that is in particular an off-center passage for supply of raw air.

Number 86 is a drain passage of the connecting head 80 for draining the separated liquid.

Number 100 is an air/oil separator apparatus, in particular a filter system, for separating liquid and air, in particular an aerosol which is formed of liquid, wherein the liquid is for example oil, fuel, hydraulic liquid, or cooling medium.

Number 210 is a first filter medium of the filter element which is formed as an annular coalescing element and which is in particular a glass fiber material of a multi-coiled configuration.

Number 220 refers to a further filter medium of the filter element configured as an annular coalescing element, the further filter medium being in particular a nonwoven.

Number 230 refers to the liquid collecting chamber in the interior of the filter element.

Number 280 is a liquid drain that is arranged between the housing cover 20 and the nipple 50 and that is embodied as at least one through bore of the housing cover 20.

While specific embodiments of the invention have been shown and described in detail to illustrate the inventive principles, it will be understood that the invention may be embodied otherwise without departing from such principles.

What is claimed is:

1. A device for separating liquid from air of a spin-on filter type comprising, a cup-shaped housing assembly; and at least one annular filter element disposed and fixed within an interior of the cup-shaped housing assembly forming a unitary spin-on filter, so as be completely replaced together in a service situation, the at least one annular filter element elongated along a longitudinal axis and surrounding the longitudinal axis;

wherein the cup-shaped housing assembly comprises:

a cup-shaped housing body having an interior and adapted to receive at least one annular filter element for separating liquid from air;

a housing cover that closes off an end face of the housing body, wherein the housing cover has an inner side that is facing the interior and an outer side that is facing away from the interior;

wherein the housing cover has at least one raw air inlet arranged off-center in the housing cover through which raw air is supplied to the interior;

wherein the housing cover has a central clean air opening though which filtered clean air is discharged from the interior, wherein the filter element has an open end facing the housing cover;

wherein the housing cover has a connecting section in an area of the clean air opening, wherein the connecting section is an inner thread of the housing cover connectable to an outer thread of a nipple;

wherein an annular seal for sealing the raw air side relative to the environment is attached to the housing cover that can be contacted and compressed in axial direction;

wherein the housing cover has at least one liquid drain arranged at a clean air side of the cup-shaped housing assembly extending in the direction of the longitudinal axis, from the inner side of the housing cover which is facing the interior of the cup-shaped housing assembly to the outer side of the housing cover which is facing away from the interior of the cup-shaped housing assembly, the at least one liquid drain being arranged in radial direction between the centrally arranged clean air outlet and the raw air inlet, wherein the at least one liquid drain is formed by at least one groove or at least one recess, passage or bore in the housing cover that is arranged in radial direction between the clean air opening at the housing cover and the at least one raw air inlet;

wherein, for sealing the raw air inlet relative to the clean air opening, at least one annular sealing surface is arranged at the outer side of the housing cover, wherein the at least one sealing surface is arranged on the housing cover such that, in a connected state, the at least one sealing surface seals the at least one raw air inlet relative to the at least one liquid drain;

wherein a liquid collecting chamber is provided at an axial end of the filter element that is facing the housing cover, wherein the liquid collecting chamber is fluidically connected with the liquid drain such that separated liquid can be returned from the liquid collecting chamber through the liquid drain.

2. The device for separating liquid according to claim 1, wherein the at least one sealing surface is embodied by a surface of the housing cover.

3. The device for separating liquid according to claim 1, wherein the at least one sealing surface is in the form of at least one seal arranged on the housing cover.

4. The device for separating liquid according to claim 3, wherein the at least one seal is a sealing ring that surrounds the clean air opening.

5. The device for separating liquid according to claim 1, wherein:

the clean air opening is adapted to receive a nipple connectable to a connecting head of a power machine, the nipple extending in a direction of the longitudinal axis through the housing cover;

the housing cover, in the area of the clean air opening, is detachably connected with the nipple;

the at least one sealing surface is arranged such on the housing cover that, when the housing cover and the nipple are connected to each other in a connected state, the at least one sealing surface is arranged between the housing cover and the nipple or between the housing cover and the connecting head connected to the nipple and seals the at least one raw air inlet relative to the at least one clean air opening.

6. The device for separating liquid according to claim 5, wherein the at least one sealing surface is configured such that, in the connected state, the at least one sealing surface interacts with a radial projection of the nipple or with a sealing surface of the connecting head such that the at least one clean air opening is sealed relative to the at least one raw air inlet.

7. The device for separating liquid according to claim 5, wherein the connecting section of the housing cover interacts with a connecting section of the nipple so as to detachably connect the housing cover and the nipple, wherein the connecting sections of the housing cover and of the nipple are configured such that, in the connected state, between the housing cover and the nipple at least one liquid drain is arranged that drains separated liquid from the interior.

8. The device for separating liquid according to claim 7, wherein the at least one liquid drain is arranged at a clean air side of the cup-shaped housing assembly and wherein the at least one sealing surface is arranged on the housing cover such that the at least one sealing surface seals the at least one raw air inlet relative to the liquid drain.

9. The device for separating liquid according to claim 7, wherein the at least one liquid drain extends in the direction of the longitudinal axis from the inner side of the housing cover to the outer side of the housing cover.

10. The device for separating liquid according to claim 9, wherein the at least one liquid drain is formed by at least one groove or at least one channel-shaped recess which is provided on the connecting section of the housing cover and/or on the connecting section of the nipple.

11. The device for separating liquid according to claim 7, wherein the at least one liquid drain extends spirally from the inner side of the housing cover to the outer side of the housing cover.

12. The device for separating liquid according to claim 7, wherein the connecting section of the housing cover is an inner thread of the housing cover and wherein the connecting section of the nipple is an outer thread of the nipple, wherein the inner thread is screwed onto the outer thread.

13. The device for separating liquid according to claim 7, wherein the connecting section of the housing cover is configured such that, in the connected state, between the housing cover and the nipple several of the at least one liquid drain are arranged, wherein the at least one sealing surface is a seal provided with at least one fixation element extending in the direction of the longitudinal axis, wherein the fixation element secures the seal on the housing cover, wherein the fixation element is arranged on the housing cover such that the fixation element extends through one of the several liquid drains.

14. The device for separating liquid according to claim 7, wherein the clean air opening is centrally arranged in the housing cover and the at least one raw air inlet is arranged off center in the housing cover.

15. The device for separating liquid according to claim 14, wherein the at least one liquid drain is at least one groove or at least one recess in the housing cover that is arranged in radial direction between the clean air opening at the housing cover and the at least one raw air inlet arranged off-center in the housing cover, wherein the at least one sealing surface is arranged annularly and radially between the at least one raw air inlet and the at least one liquid drain at the housing cover such that the at least one sealing surface seals the at least one raw air inlet relative to the at least one liquid drain.

16. The device for separating liquid according to claim 1, wherein the cup-shaped housing assembly comprises a liquid collecting chamber at a clean air side of the filter element and a liquid drain connected to the liquid collecting chamber.

17. The device for separating liquid according to claim 16, further comprising a nipple which is detachably connected with a connecting head of a power machine and with the cup-shaped housing assembly.

18. The device for separating liquid according to claim 17, wherein the nipple and/or the cup-shaped housing assembly are designed such that, when the cup-shaped housing assembly and the nipple are connected in a connected state, the at least one liquid drain is formed between the cup-shaped housing assembly and the nipple.

19. The device for separating liquid according to claim 18, wherein the nipple comprises a cylindrical tubular element designed for separating separated liquid from filtered clean air, wherein the cylindrical tubular element is monolithically formed together with the nipple and projects into the filter element, wherein the cylindrical tubular element forms a clean air outlet for discharging the filtered clean air from the cup-shaped housing assembly.

20. The device for separating liquid according to claim 19, wherein the nipple has a connecting section adapted to connect the nipple to the housing cover of the cup-shaped housing assembly, wherein the clean air outlet adjoins the connecting section and/or has an inner diameter that is identical to an inner diameter of the connecting section of the nipple.

21. The device for separating liquid according to claim 18, wherein the at least one liquid drain is adapted to discharge in the connected state the separated liquid from the liquid collecting chamber to the connecting head.

22. The device for separating liquid according to claim 18, wherein the at least one raw air inlet of the cup-shaped housing assembly is arranged off-center on the cup-shaped housing assembly, wherein the nipple is centrally arranged on the cup-shaped housing assembly, and wherein the at least one sealing surface at the housing cover of the cup-shaped housing assembly is an axial sealing surface and is arranged between the housing cover and a radially extending projection of the nipple and/or an area of the connecting head such that the at least one sealing surface seals the liquid drain relative to the at least one raw air inlet.

23. A method for mounting a device for separating liquid having a cup-shaped housing assembly according to claim 1 detachably on a connecting head of a power machine, the method comprising:

detachably connecting the cup-shaped housing assembly to a nipple that is connectable to the connecting head.

24. The method according to claim 23, comprising screwing the cup-shaped housing assembly onto the nipple.

* * * * *